(12) United States Patent
Yoshida

(10) Patent No.: US 8,473,788 B2
(45) Date of Patent: Jun. 25, 2013

(54) MONITORING PROGRAM, MONITORING APPARATUS, AND MONITORING METHOD

(75) Inventor: Taketoshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 13/020,094

(22) Filed: Feb. 3, 2011

(65) Prior Publication Data

US 2011/0219268 A1     Sep. 8, 2011

(30) Foreign Application Priority Data

Mar. 5, 2010   (JP) .................................. 2010-49529

(51) Int. Cl.
*G06F 11/00* (2006.01)

(52) U.S. Cl.
USPC .......................................... 714/43; 714/748

(58) Field of Classification Search
USPC ............... 714/43, 44, 47.1, 56, 4.1, 748, 749, 714/750

See application file for complete search history.

(56) References Cited

U.S. PATENT DOCUMENTS 7,697,948 B2 *   4/2010   Wan et al. ..................... 455/509
8,050,248 B2 *  11/2011   Meyer et al. .................. 370/349

FOREIGN PATENT DOCUMENTS

JP       2005-252765        9/2005

* cited by examiner

*Primary Examiner* — Dieu-Minh Le
(74) *Attorney, Agent, or Firm* — Fujitsu Patent Center

(57) ABSTRACT

A method for a computer, which is configured to access to hierarchical information indicating a hierarchical structure relating to processes executed by devices included in a network, includes receiving abnormal observation data from the network, detecting a transmission source device of the abnormal observation data and a process by which the abnormal observation data is issued, specifying a process relating, to the detected process in accordance with a kind of the detected transmission source device by referring to the hierarchical information, determining, by the computer, a failure occurrence point based on a status of the specified process.

20 Claims, 24 Drawing Sheets

FIG. 8

OBSERVATION RESULT DB — 800

| DEVICE ID | IP ADDRESS | PROCESS | OBSERVATION RESULT |
|---|---|---|---|
| ROUTER | 190.0.0.0 | p00 | |
| | | p01 | |
| | | p02 | |
| SWITCH s1 | 190.0.0.1 | p00 | |
| | | p01 | |
| | | p02 | |
| ⋮ | ⋮ | ⋮ | ⋮ |
| SERVER S1 | 190.0.0.2 | p10 | |
| | | p11 | |
| | | p12 | |
| | | p13 | |
| | | p14 | |
| | | p15 | |
| | | p16 | |
| | 190.0.0.3 | p20 | |
| | | p21 | |
| | | p22 | |
| | 190.0.0.4 | f1 | |
| | | f2 | |
| | | ⋮ | ⋮ |
| | | f7 | |
| ⋮ | ⋮ | ⋮ | ⋮ |

MONITORING PROGRAM, MONITORING APPARATUS, AND MONITORING METHOD

CROSS-REFERENCE TO RELATED APPLICATIONS

This application is based upon and claims the benefit of priority of the prior Japanese Patent Application No. 2010-49529, filed on Mar. 5, 2010, the entire contents of which are incorporated herein by reference.

FIELD

The embodiments discussed herein are related to a monitoring program, a monitoring apparatus, and a monitoring method for monitoring a network.

BACKGROUND

A network fault determination apparatus that determines a fault in a network formed by connecting a plurality of information communication devices is disclosed in the related art (see Japanese Laid-open Patent Publication No. 2005-252765, for example). The apparatus of Patent Document 1 specifies the cause of a failure in the network utilizing only warnings generated by the information communication devices without using information provided by a user. Specifically, the apparatus collects warnings through communication with the information communication devices, compares the collected warnings with warning generation patterns in a warning generation pattern table, and determines the cause of a warning corresponding to a warning generation pattern coinciding with the collected warnings as the main cause of the failure. The apparatus also identifies incommunicable information communication devices on the basis of the connection relationship of the information communication device which involved the main cause of the failure, and identifies incommunicable logical circuits on the basis of the state of the information communication devices on a logical line route.

However, the apparatus according to the related art discussed above does not consider the hierarchical relationship peculiar to the network. Therefore, it cannot be known whether a notification of an error in a device A is made due to a fault of the device A itself or made under influence of a device B in a level higher than the device A even though no fault is occurring in the device A. Thus, the apparatus may not be able to specify the device that is truly at fault.

SUMMARY

According to a certain aspect of the invention, a method for a computer, which is configured to access hierarchical information indicating a hierarchical structure relating to processes executed by devices included in a network, includes receiving abnormal observation data from the network, detecting a transmission source device of the abnormal observation data and a process by which the abnormal observation data is issued, specifying a process relating, to the detected process in accordance with a kind of the detected transmission source device by referring to the hierarchical information, determining, by the computer, a failure occurrence point based a on status of the specified process.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 8 illustrates an example content stored in an observation result DB.

DESCRIPTION OF EMBODIMENTS

A monitoring program, a monitoring apparatus, and a monitoring method according to an embodiment of the present invention will be described in detail below with reference to the accompanying drawings.

Example Configuration of Network

Figure 1:
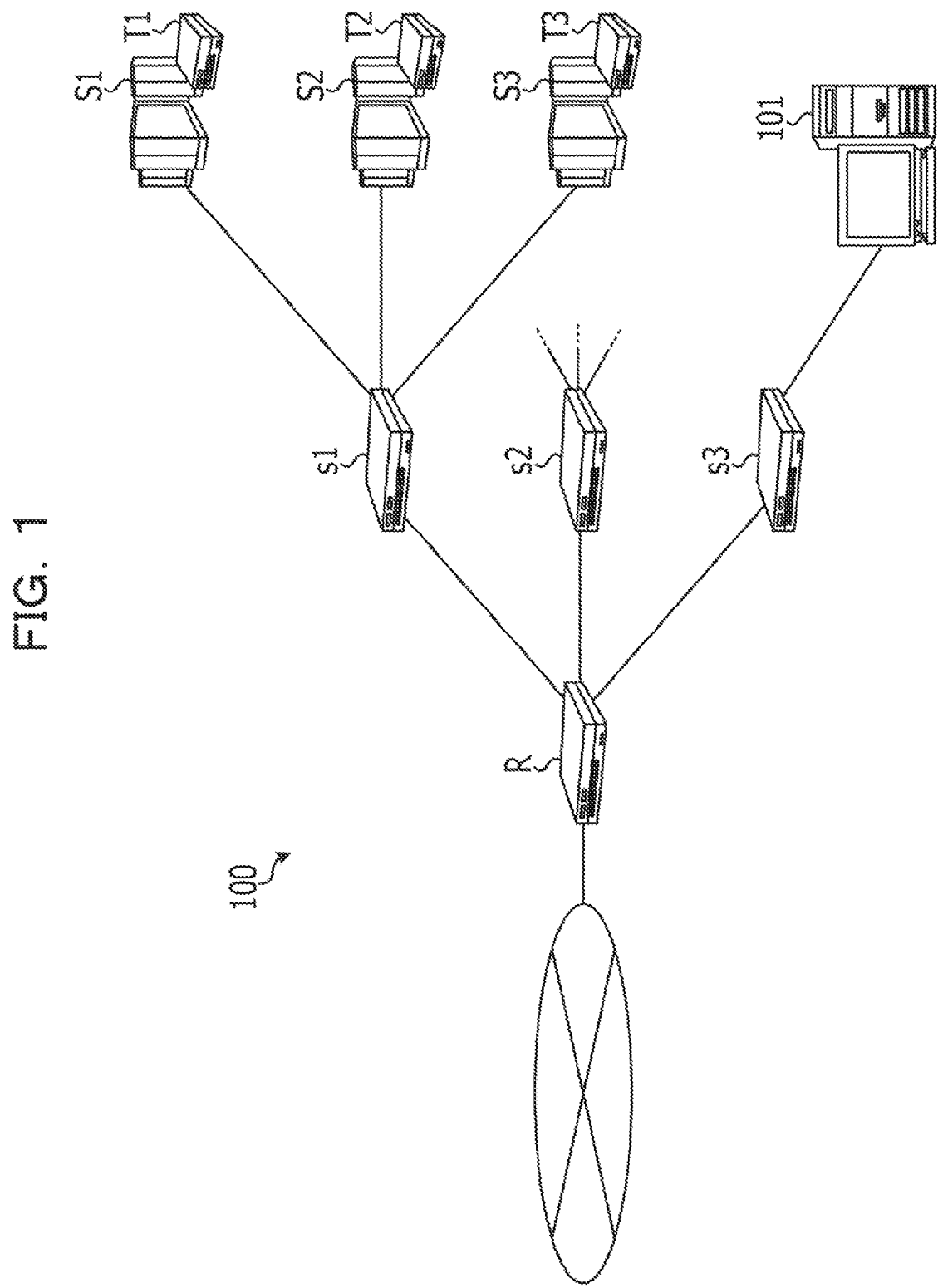
FIG. 1 illustrates an example configuration of a network.

FIG. 1 illustrates an example configuration of a network. In a network 100 illustrated in FIG. 1, a router R at the left end is in the highest level, and servers S1 to S3 at the right end are in the lowest level, with the levels of devices becoming sequentially lower toward the right. Switches s1 to s3 are provided in an intermediate level. In the embodiment, network devices such as the router R and the switches s1 to s3 are referred to as "relay devices". A monitoring apparatus 101 is also connected in the lowest level.

The relay devices execute a process (program) related to relaying. The servers S1 to S3 execute a process specific to an OS (Operating System) or an application. In the embodiment, the monitoring apparatus 101 specifies what process in the relay devices or the servers S1 to S3 is a failure occurrence point.

The servers S1 to S3 include monitoring hardware T1 to T3, respectively. The monitoring hardware T1 to T3 may be built in or directly connected to the servers S1 to S3, respectively, and may be implemented by a dedicated chip that monitors hardware, such as a CPU, a memory, and a power source, in the servers S1 to S3. A basement management controller (BMC), for example, may be adopted as the monitoring hardware T1 to T3.

In the embodiment, if there is a failure in a process in the servers S1 to S3, the monitoring hardware T1 to T3 can find out whether or not the failure is caused by a malfunction or a fault of hardware in the servers S1 to S3. In this way, in the embodiment, the monitoring apparatus 101 specifies a process executed in the relay devices or the servers S1 to S3 in the network 100 or hardware in the servers S1 to S3 as the failure occurrence point.

(Hardware Configuration of Monitoring Apparatus 101)

Figure 2:
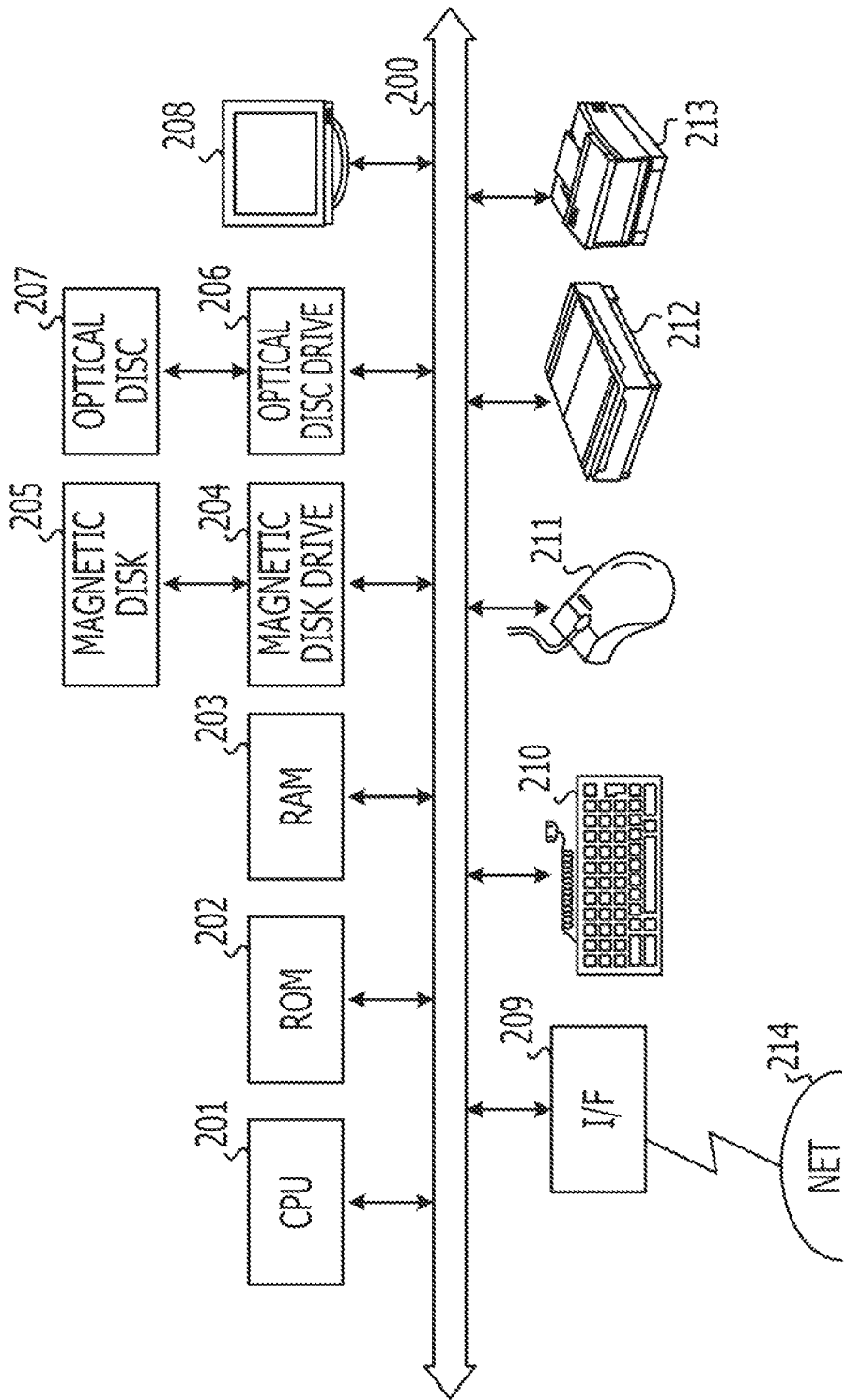
FIG. 2 illustrates an example hardware configuration of a monitoring apparatus.

FIG. 2 is a block diagram illustrating the hardware configuration of the monitoring apparatus 101. As illustrated in FIG. 2, the monitoring apparatus 101 includes a CPU (Central Processing Unit) 201, a ROM (Read Only Memory) 202, a RAM (Random Access Memory) 203, a magnetic disk drive 204, a magnetic disk 205, an optical disc drive 206, an optical disc 207, a display 208, an I/F (Interface) 209, a keyboard 210, a mouse 211, a scanner 212, and a printer 213. The components are connected to each other through a bus 200.

The CPU 201 governs control of the entire monitoring apparatus 101. The ROM 202 stores programs such as a boot program. The RAM 203 is used as a work area of the CPU 201. The magnetic disk drive 204 controls reading/writing of data from/into the magnetic disk 205 in accordance with the control performed by the CPU 201. The magnetic disk 205 stores the data written through the control performed by the magnetic disk drive 204.

The optical disc drive 206 controls reading/writing of data from/into the optical disc 207 in accordance with the control performed by the CPU 201. The optical disc 207 stores the data written through the control performed by the optical disc drive 206, and allows the data stored in the optical disc 207 to be read by a computer.

The display 208 displays data such as documents, images, and functional information including cursors, icons, and tool boxes. A CRT display, a TFT liquid crystal display, a plasma display, or the like, for example, may be adopted as the display 208.

The interface (hereinafter abbreviated as an "I/F") 209 is connected to a network 214, such as a LAN (Local Area Network), a WAN (Wide Area Network), or the Internet, through a communication line, and connected to other apparatuses via the network 214. The I/F 209 governs interfacing between the network 214 and the inside of the monitoring apparatus 101, and controls input/output of data from/to external apparatuses. A modem, a LAN adaptor, or the like, for example, may be adopted as the I/F 209.

The keyboard 210 includes keys for inputting characters, numerals, various instructions, and so forth, and is used to input data. A touch-panel input pad, a numeric keypad, or the like may be used instead. The mouse 211 is used to move a cursor, select a range, move a window, change a window size, and so forth. A pointing device with a similar function, such as a track ball or a joystick, may be used instead.

The scanner 212 optically reads an image to take image data into the monitoring apparatus 101. The scanner 212 may be provided with an OCR (Optical Character Reader) function. The printer 213 prints image data and document data. A laser printer or an inkjet printer, for example, may be adopted as the printer 213.

(Device Connection Information DB)

Next, information possessed by the devices forming the network will be described. The router, the switches, and the monitoring hardware each include a device connection information database (DB). The device connection information DB is a database storing information specifying a device from which that device is connected and devices to which that device is connected (connection destinations). The monitoring apparatus 101 collects device connection information in the device connection information DBs in the network to specify the hierarchical structure of the network.

Figure 3:
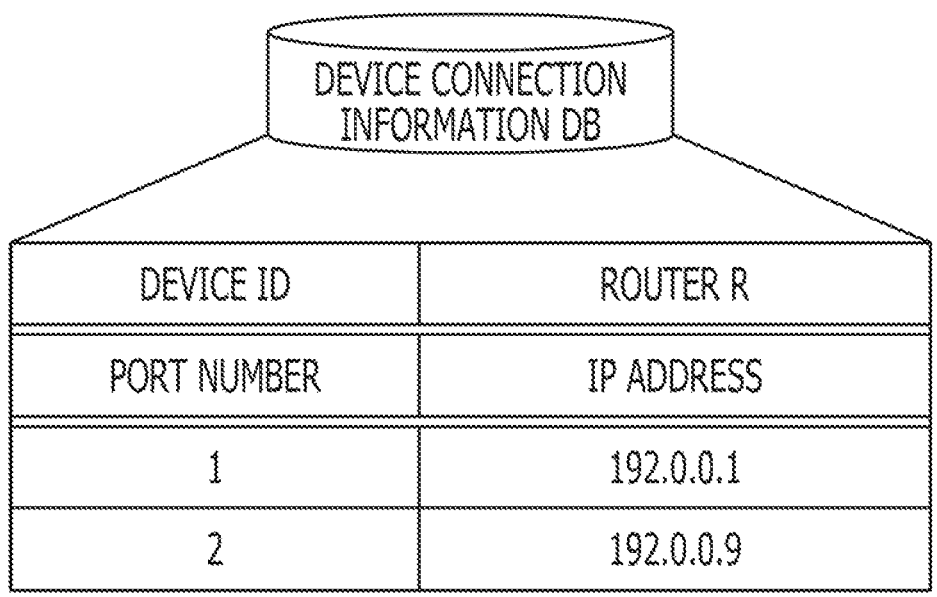
FIG. 3 illustrates an example content stored in a device connection information DB of a router.

FIG. 3 illustrates a content stored in the device connection information DB of the router. The device connection information DB of the router stores, as the device connection information, the device ID of the router, the port number of a port connected to a connection destination, and the IP address of a connection destination corresponding to a port number.

Figure 4:
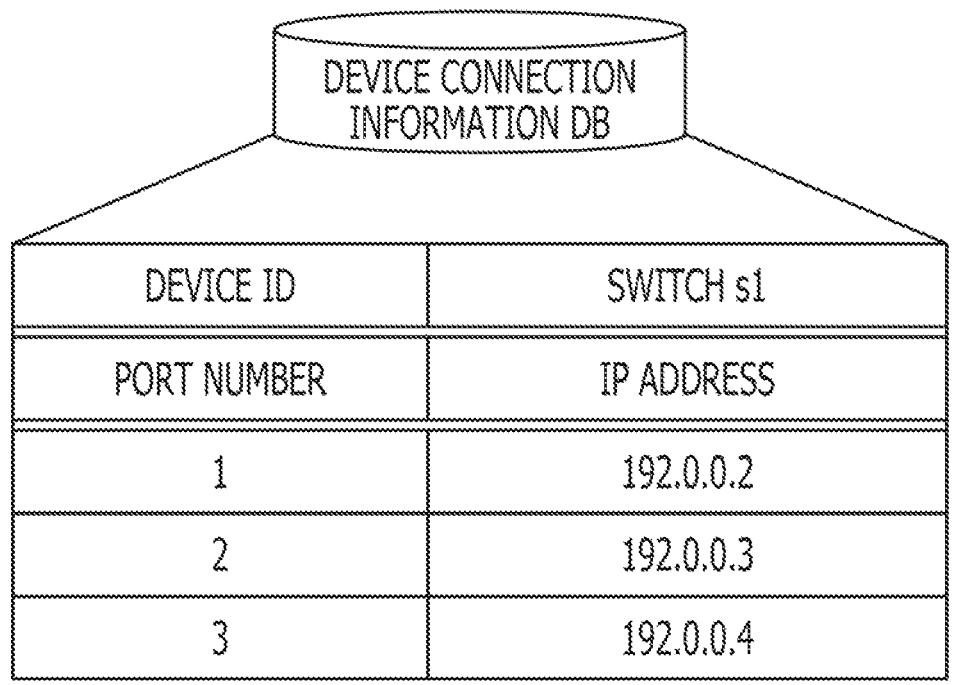
FIG. 4 illustrates an example content stored in a device connection information DB of a switch.

FIG. 4 illustrates a content stored in the device connection information DB of each switch. The device connection information DB of each switch stores, as the device connection information, the device ID of the switch, the port number of a port connected to a connection destination, and the IP address of a connection destination corresponding to a port number.

Figure 5:
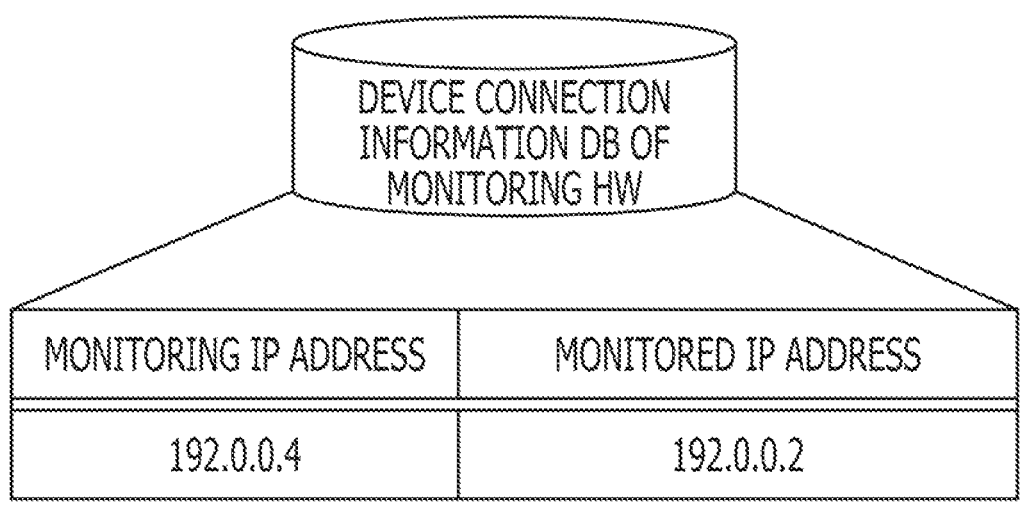
FIG. 5 illustrates an example content stored in a device connection information DB of monitoring hardware.

FIG. 5 illustrates a content stored in the device connection information DB of each monitoring hardware. The device connection information DB of each monitoring hardware stores, as the device connection information, the IP address of the monitoring hardware and the IP address of a server to be monitored.

(Hierarchical Structure Information)

Figure 6:
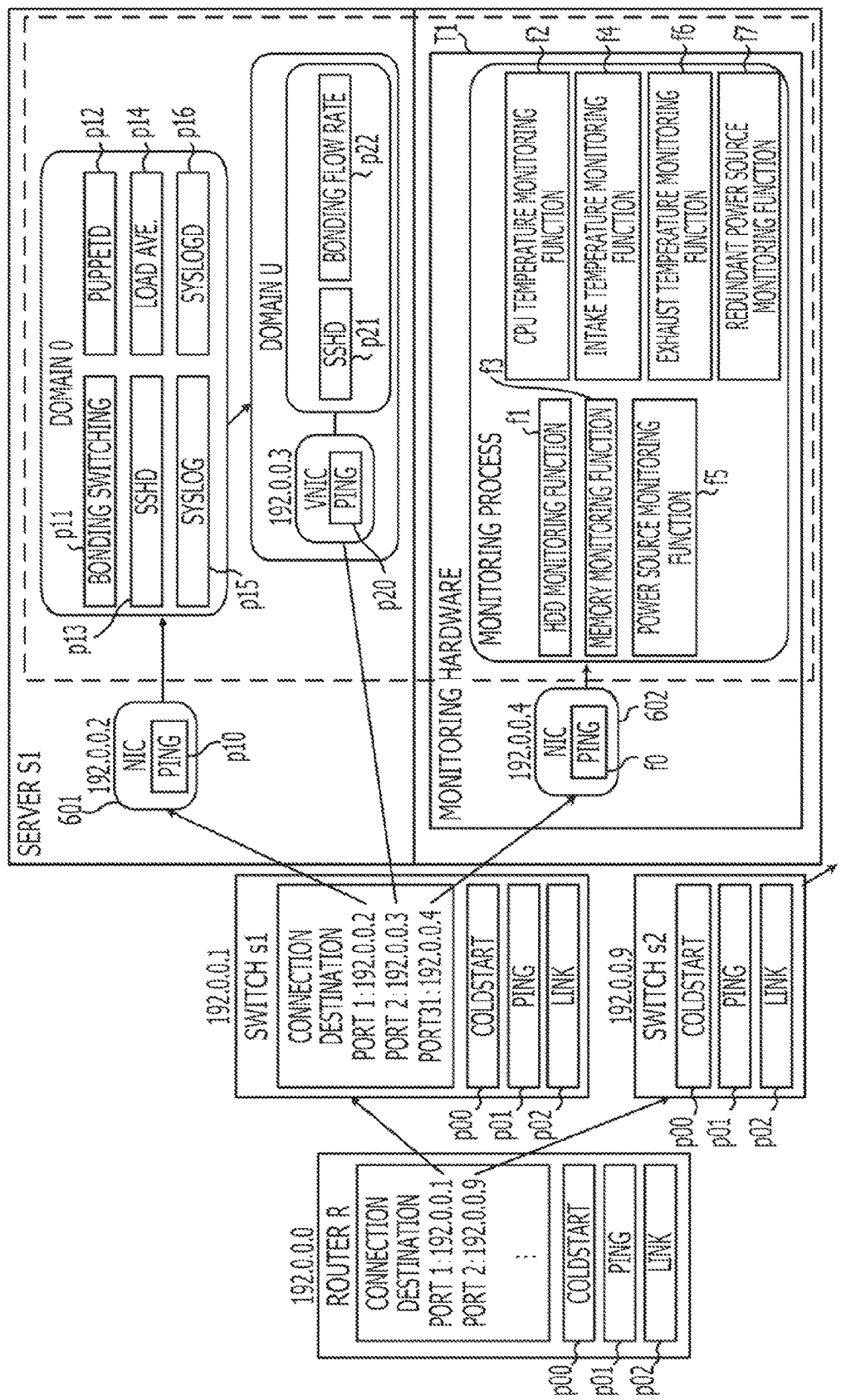
FIG. 6 illustrates example hierarchical structure information on the network based on device connection information in the device connection information DBs of FIGS. 3 to 5.
Figure 7:
FIG. 7 illustrates an example content stored in an association DB obtained by organizing into a database the hierarchical structure information illustrated in FIG. 6.

FIG. 6 illustrates example hierarchical structure information on the network based on the device connection information in the device connection information DBs of FIGS. 3 to 5. FIG. 7 illustrates an example content stored in an association DB 700 obtained by organizing into a database the hierarchical structure information illustrated in FIG. 6.

As illustrated in FIG. 6, the router R and the switch s1, which are each a relay device, execute processes p00 to p02 (which are ColdStart, ping, and Link, respectively, for example). ColdStart is a process for initializing hardware such as a main memory by once turning off the power source to then restart the hardware, as in turning on the power source. If there is an abnormality in ColdStart, startup of the relay device is not completed, and therefore other processes may not be executed.

Ping is a process related to confirming communication with a device connected in a higher level. If ping is normal, it is judged that communication between the relevant device and the device in the upper level is normal. In the case where an abnormality is detected in ping, on the other hand, it is considered that any failure is occurring in communication between the relevant device and the device in the upper level.

Link is a process for sensing an abnormality in communication with a subordinate device as a connection destination for each port. For example, in the case where Link is UP (normal), it is indicated that transfer with the subordinate device can be performed. In the case where Link is DOWN (abnormal), transfer with the subordinate device cannot be performed.

The server S1 includes an NIC (Network Interface Card) 601. The NIC 601 executes a process p10. The server S1 also includes Domain-0 and Domain-U. In Domain-0, processes p11 to p16 are executed through the OS or an application. In Domain-U, which is a group of processes that function as a virtual machine, processes p20 to p22 are executed. Domain-U is subordinate to Domain-0. Therefore, an abnormality in a process in Domain-U does not influence Domain-0. However, if there is an abnormality in all the processes in Domain-0, such an abnormality is rippled to Domain-U so that all the processes in Domain-U become abnormal.

The monitoring hardware T1 is provided in the server S1. The monitoring hardware T1 includes an NIC 602, and executes a process f0. Monitoring processes f1 to f7 are subordinate to the process f0. The monitoring processes f1 to f7 monitor the state of hardware, such as a CPU, an HDD, a memory, and a power source, in the server S1. In FIG. 6, the dotted rectangle indicates a range on which the monitoring processes exert influence.

Specifically, in the case where an abnormality occurs in all the processes p11 to p16 in Domain-0 and the processes p20 to p22 in Domain-U, and if there is an abnormality in the monitoring processes f1 to f7, such an abnormality is judged as a failure in hardware to be monitored by the monitoring processes f1 to f7 (for an HDD monitoring function f1, the HDD, for example), rather than an error of the processes p11 to p16 and p20 to p22 themselves.

In FIG. 7, for each of the processes p11 to p16 and p20 to p20, which belongs to a domain, information on the domain to which each process belongs is also stored. That is, in the case where a process is retrieved from the subordinate items in the association DB 700, it is found which domain the retrieved process belongs.

FIG. 8 illustrates a content stored in an observation result DB 800. In the observation result DB 800, observation results are updated each time observation data are acquired from a process in a relay device, a server, or monitoring hardware.

Figure 9:
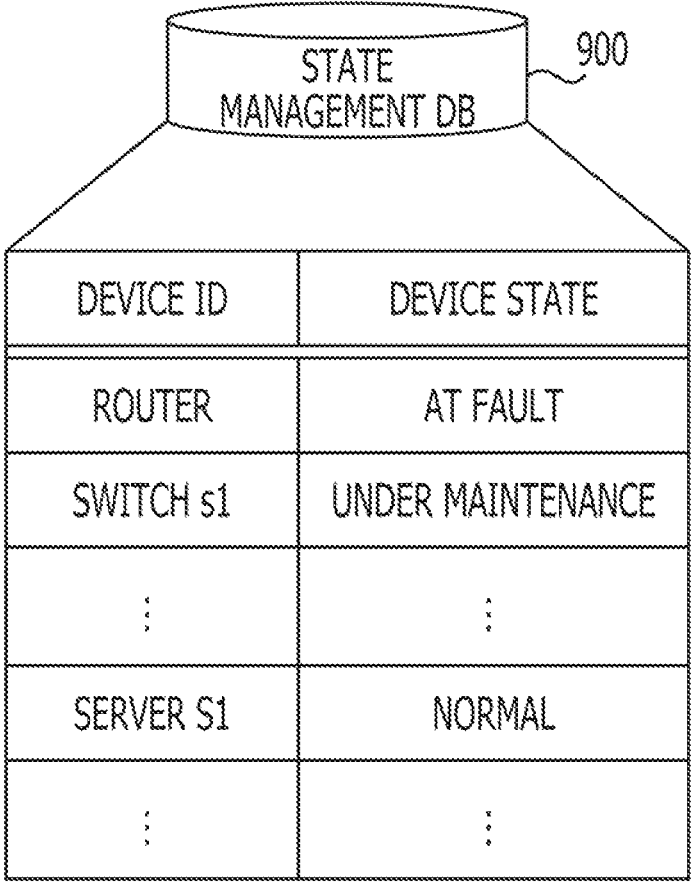
FIG. 9 illustrates an example content stored in a state management DB.

FIG. 9 illustrates a content stored in a state management DB 900. The state management DB 900 is a database storing the device ID and the device state of each device to be monitored. The device state may be set to "At Fault" or "Under Maintenance", for example. Such settings in the state management DB 900 may be updated autonomously by the monitoring apparatus 101 when a notification is received from each device to be monitored, or by a user operation. After repair or maintenance is completed, the device state is updated to "Normal" autonomously by the monitoring apparatus 101 or by a user operation.

Figure 10:
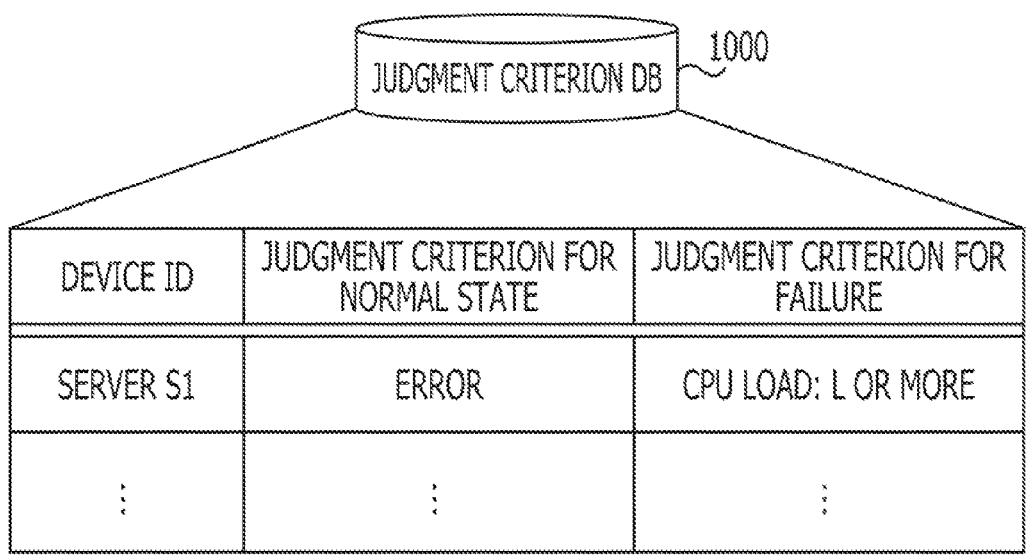
FIG. 10 illustrates an example content (part 1) stored in a judgment criterion DB.

FIG. 10 illustrates a content stored in a judgment criterion DB 1000. The judgment criterion DB 1000 is a database storing the device ID, the judgment criterion for a normal state, and the judgment criterion for a failure. The judgment criterion for a normal state may be whether or not there is an error in the observation data. Meanwhile, the judgment criterion for a failure may be a threshold set for the observation data, for example. For example, in the case of observation data for the process p14 (LoadAve), if there is an "error" in the CPU load (the CPU load is unmeasurable), such a state falls within the criterion for determining a normal state. When the CPU load is a threshold L or more, on the other hand, such a state falls within the judgment criterion for a failure, and therefore it is judged that there is a failure in the sender device.

The association DB 700, the observation result DB 800, the state management DB 900, and the judgment criterion DB 1000 discussed above are specifically implemented by the ROM 202, the RAM 203, the magnetic disk 205, and the optical disc 207 illustrated in FIG. 2, for example.

(Registration Notification)

Figure 11:
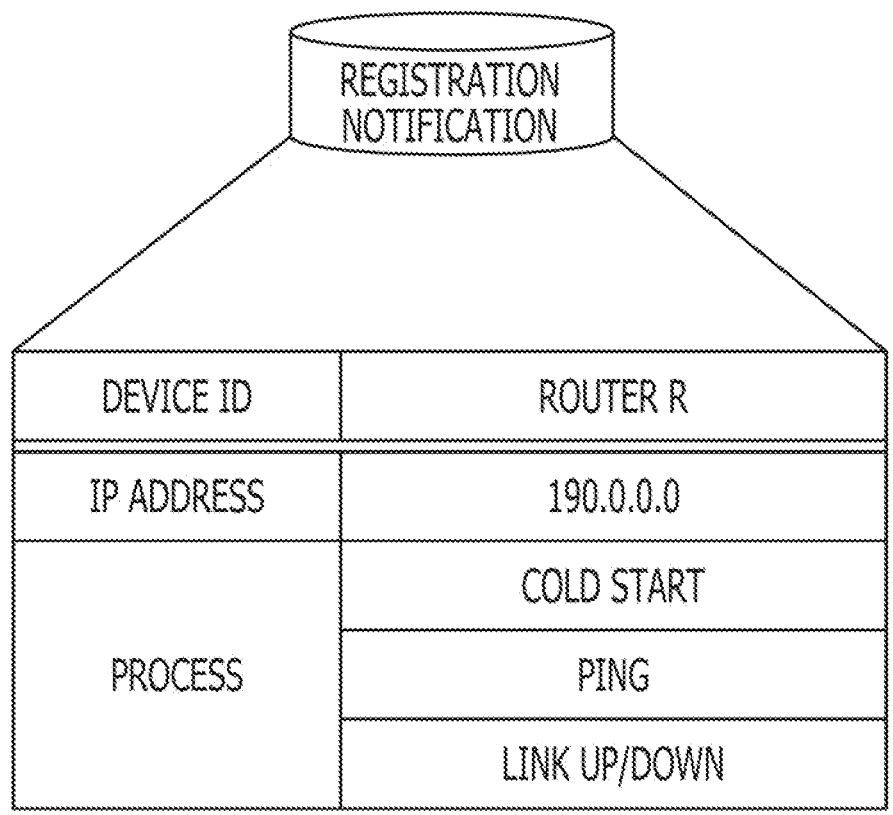
FIG. 11 illustrates an example content (part 2) stored in the judgment criterion DB.
Figure 12:
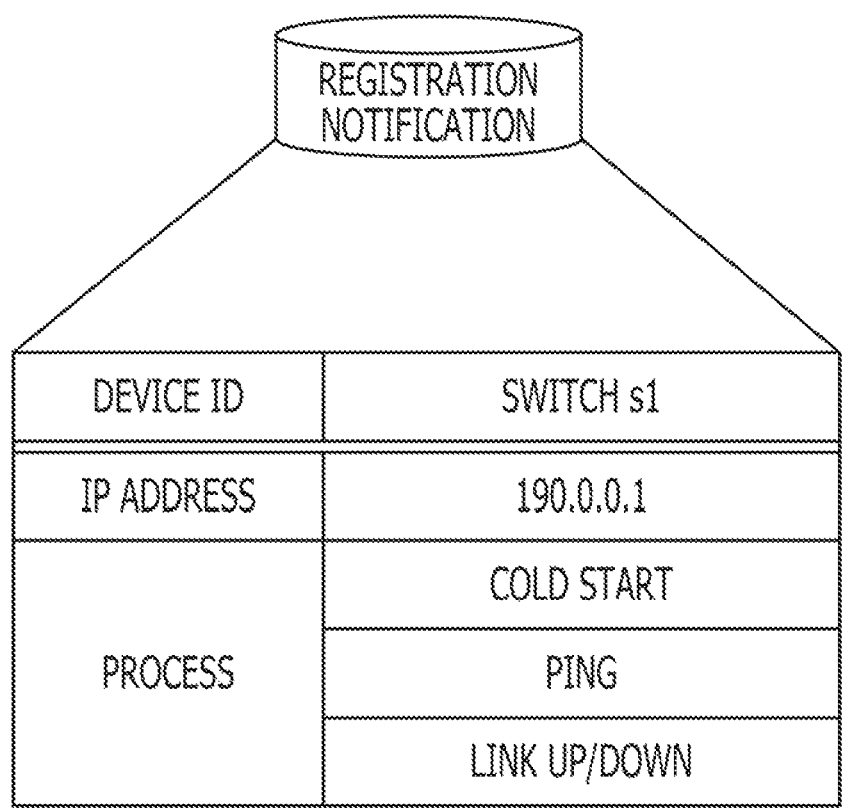
FIG. 12 illustrates an example content (part 3) stored in the judgment criterion DB.
Figure 13:
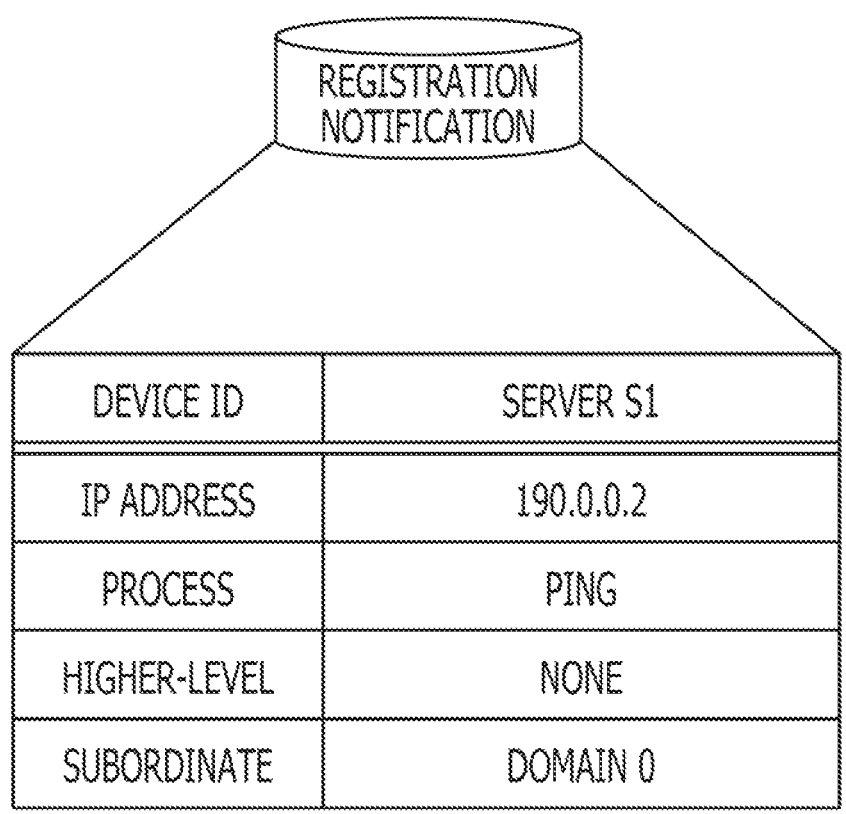
FIG. 13 illustrates an example content (part 4) stored in the judgment criterion DB.
Figure 14:
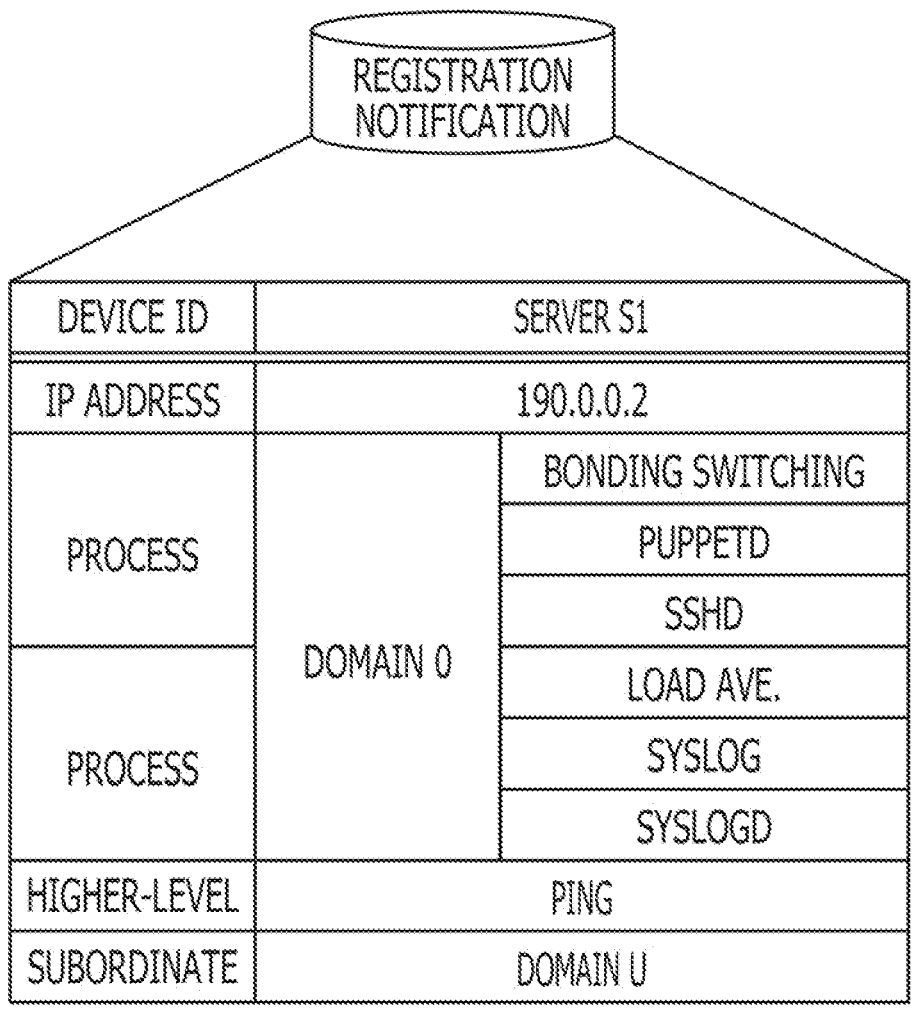
FIG. 14 illustrates an example content (part 5) stored in the judgment criterion DB.
Figure 15:
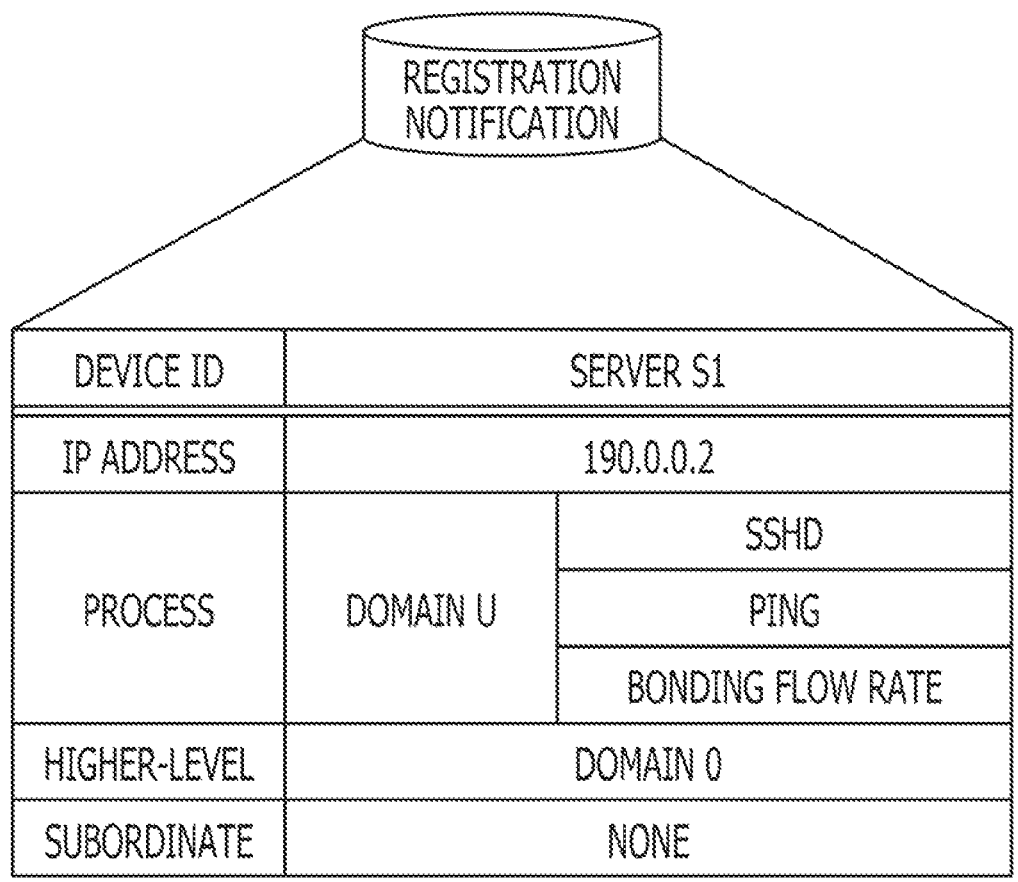
FIG. 15 illustrates an example registration notification.

FIGS. 11 to 15 illustrate an example registration notification. FIG. 11 illustrates a registration notification from the router. FIG. 12 illustrates a registration notification from a switch. FIGS. 13 to 15 illustrate a registration notification from a server. The registration notifications of FIGS. 11 to 15 are common in including a device ID of the device making the notification, an IP address, and a process.

The registration notification of FIG. 13 is a registration notification for registering ping which is the process p10 in the NIC. The registration notification of FIG. 14 is a registration notification for registering Domain-0, which is a group of processes that function as a real machine. The registration notification of FIG. 15 is a registration notification for registering Domain-U, which is a group of processes that function as a virtual machine.

The registration notifications from a server of FIGS. 13 to 15 are provided with a higher-level item and a subordinate item. The higher-level item indicates a process in a level higher than the process included in the registration notification. For example, the registration notification of FIG. 14 indicates that ping (process p10) is provided in the level higher than Domain-0 in the server S1.

Meanwhile, the subordinate item indicates a process subordinate to the process included in the registration notification. For example, the registration notification of FIG. 14 indicates that Domain-U is provided subordinate to Domain-0 in the server S1.

Figure 16:
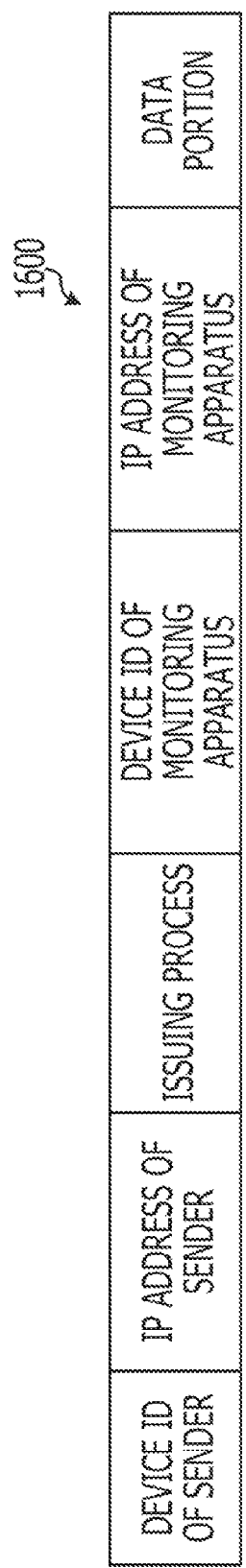
FIG. 16 illustrates an example data structure of observation data.

FIG. 16 illustrates an example data structure of observation data. Observation data 1600 are issued from a process in a relay device or a server, and transmitted to the monitoring apparatus 101. The observation data 1600 include a header portion and a data portion. The header portion includes a device ID of the sender, an IP address of the sender, an issuing process, a device ID of the monitoring apparatus 101 to which the observation data 1600 are addressed, and an IP address of the monitoring apparatus 101. The data portion includes observation results.

In the case where the issuing process is a process in a server, domain hierarchy information (higher level/subordinate) is also included. In the case where the issuing process is an alive monitoring process, an alive/dead state of the process to be monitored is also included. In the case where a process becomes inoperable, the process may not be able to issue an error by itself. A notification of the state of such a process can even be made.

(Functional Configuration of Monitoring Apparatus 101)

Figure 17:
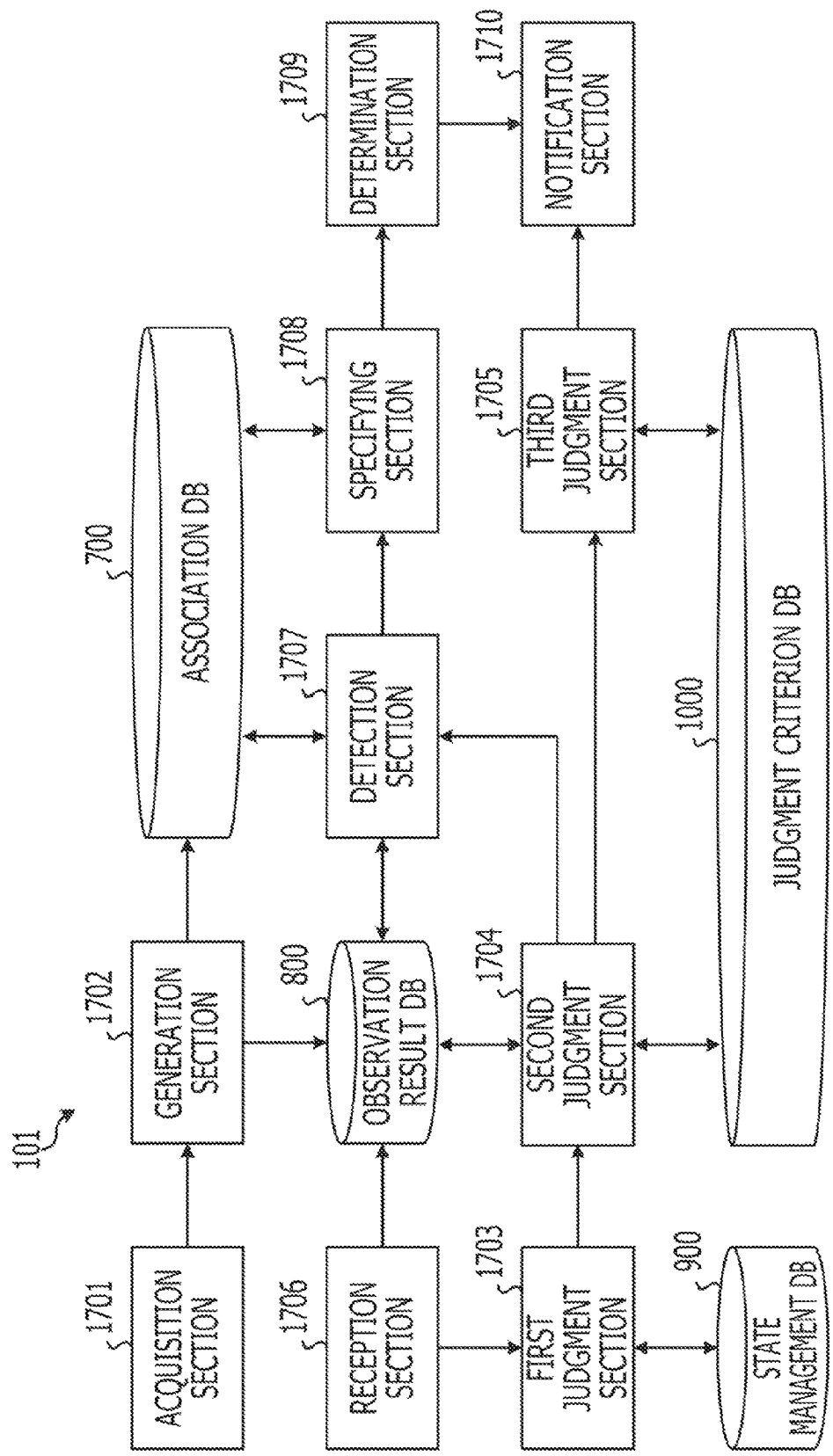
FIG. 17 illustrates an example configuration of the monitoring apparatus.

FIG. 17 is a block diagram illustrating the functional configuration of the monitoring apparatus 101. The monitoring apparatus 101 includes the association DB 700, the observation result DB 800, the state management DB 900, the judgment criterion DB 1000, an acquisition section 1701, a generation section 1702, a reception section 1706, a first judgment section 1703, a second judgment section 1704, a third judgment section 1705, a detection section 1707, a specifying section 1708, a determination section 1709, and a notification section 1710.

The acquisition section 1701 to the notification section 1710 are specifically implemented by causing the CPU 201 to execute a program stored in the ROM 202, the RAM 203, the magnetic disk 205, and the optical disc 207 illustrated in FIG. 2, for example.

The acquisition section 1701 has a function of acquiring device connection information from the router R, the switches s1 to s3, and the monitoring hardware T1 to T3 in the network 100. The acquisition section 1701 also acquires a registration notification from the router R, the switches s1 to s3, and the servers S1 to S3.

The generation section 1702 generates hierarchical structure information as illustrated in FIG. 9 on the basis of the device connection information and the registration notifications acquired by the acquisition section 1701. Specifically, the generation section 1702 registers information in the association DB 700. When device connection information is acquired, the generation section 1702 first registers the device ID and the IP address in the device connection information as those of a subordinate item to be monitored as a connection destination.

Next, when a registration notification is acquired, the generation section 1702 registers an item to be monitored specified in the registration notification in the association DB 700. For the registration notification from a server of FIGS. 13 to 15, which is provided with a higher-level item and a subordinate item, the higher-level and subordinate items are additionally registered in the association DB 700.

The reception section 1706 has a function of receiving observation data. Specifically, the reception section 1706 receives the observation data 1600 from the router R, the switches s1 to s3, and the servers S1 to S3 or the monitoring hardware T1 to T3, for example. The received observation data 1600 are stored in the observation result DB 800. In the embodiment, the observation data 1600 are autonomously transmitted from a sender device. For example, the sender device regularly transmits the observation data 1600. In the case of abnormal observation data, such observation data are transmitted each time an abnormality occurs.

The first judgment section 1703 has a function of judging what state the device transmitting the received observation data 1600 is in. Specifically, for example, the first judgment section 1703 specifies the sender device from the observation data 1600. Then, the first judgment section 1703 searches the state management DB 900 for the state of the specified device to be monitored. In the case where the search result is "Normal", the process proceeds to a judgment process performed by the second judgment section 1704. In the case where the search result is not "Normal" but "Under Maintenance" or "At Fault", for example, on the other hand, the point of failure cannot be specified. Therefore, the point of failure is not specified using the observation data.

For example, in the case where the sender device is the switch s1, the state of the device is "Under Maintenance" as illustrated in the state management DB 900 of FIG. 9. Thus, the point of failure is not specified using the observation data from the switch s1.

The second judgment section 1704 has a function of judging whether or not the received observation data 1600 have been obtained through normal observation. Specifically, the second judgment section 1704 makes a judgment by referencing the judgment criterion for a normal state in the judgment criterion DB 1000, for example. Then, in the case where the content of the observation data 1600 coincides with the value of the judgment criterion for a normal state, it is judged that the received observation data 1600 have not been obtained through normal observation. In the case where the content of the observation data 1600 does not coincide with the value of the judgment criterion for a normal state, on the other hand, it is judged that the received observation data 1600 have been obtained through normal observation.

In the case where the content of the observation data 1600 from the server S1 is "CPU Load L1 (<L)", for example, the content of the observation data 1600 does not coincide with the value "Error" of the judgment criterion for a normal state for the server S1 illustrated in FIG. 10. Therefore, it is judged that the received observation data 1600 have been obtained through normal observation. In the case where the content of the observation data 1600 is "Error", on the other hand, the content of the observation data 1600 coincides with the value "Error" of the judgment criterion for a normal state in the judgment criterion DB 1000 illustrated in FIG. 10. Therefore, it is judged that the received observation data 1600 have not been obtained through normal observation.

Then, in the case where it is judged that the received observation data 1600 have been obtained through normal observation, the process proceeds to a judgment process performed by the third judgment section 1705. In the case where it is judged that the received observation data 1600 have not been obtained through normal observation, the process proceeds to a specifying process performed by the specifying section 1708.

The third judgment section 1705 has a function of judging whether or not the observation data 1600 which have been obtained through normal observation indicates a failure. For example, an allowable value may be set for each type of the observation data 1600, and it may be judged that there is a failure in the device transmitting the observation data 1600 in the case where the allowable value is not met.

For example, in the case where the allowable value is "CPU Load: Less Than L", when the content of the observation data 1600 is "CPU Load: L1 (<L)", the content of the observation data 1600 falls within the range of the allowable value. Therefore, it is judged that there is no failure in the sender device. When the content of the observation data 1600 is "CPU Load: L2 ($\geq$L)", on the other hand, "CPU Load: Not Less Than L". Therefore, it is judged that there is a failure in the sender device.

The detection section 1707 has a function of detecting the device transmitting the observation data 1600 received by the reception section 1706 and the process issuing the observation data 1600. Specifically, the detection section 1707 references the observation result DB 800 to detect the device ID of the device transmitting the observation data 1600, an IP address, and the process issuing the observation data 1600 from a record in the received observation data 1600, for example.

The specifying section 1708 has a function of referencing the hierarchical structure information to specify an associated process associated with the issuing process in accordance with the type of the sender device detected by the detection section 1707. The associated process is a process, the state of which is referenced to specify a failure occurrence point using the issuing process as the starting point.

For example, in the case where the sender device is a server and the issuing process is a process related to a function specific to a server such as Domain-0 or Domain-U, the remaining processes in the same domain are specified as the associated process. For example, in the case where the issuing process is the process p11 (bonding switching) in Domain-0, the remaining processes p12 to p16 in Domain-0 are specified as the associated process. In the case where the issuing process is ping, meanwhile, processes (ColdStart, Link, and ping) in a relay device in a level higher than the sender device are specified as the associated process.

The determination section 1709 has a function of determining a failure occurrence point on the basis of the state of the associated process specified by the specifying section 1708.

The state of the associated process includes a state in which an error is issued with the associated process itself unable to operate normally, and a state in which an error is issued as a result of the associated process operating normally.

For example, for a process specific to a server such as Domain-0 or Domain-U in the server, the state of the associated process indicates whether or not an error is issued with the associated process itself unable to operate normally.

Thus, if all the remaining processes in the same domain are operating normally, it is found that a failure peculiar to the issuing process is occurring. Likewise, if there is an abnormality in some of the remaining processes while others of the remaining processes are operating normally, it is found that a failure peculiar to the issuing process and such abnormal processes is occurring.

In the case where all the remaining processes in the same domain are abnormal, on the other hand, a failure peculiar to each of the processes may be occurring, or the processes may be influenced by a process in a higher level that is not operating normally. Alternatively, the processes may be abnormal under influence of a failure of the hardware forming the server.

In such a case, if all the processes in a domain in the higher level are abnormal, the failure may be caused by an abnormality of ping in the NIC of the server. If an abnormality of ping in the NIC of the server is sensed, it may be necessary to additionally set processes in a relay device in a higher level as the associated process, and to specify the relationship between such processes and ping in the NIC of the server.

If ping in the NIC of the server is normal, that is, communication with the relay device in the higher level is confirmed, a failure peculiar to each of the processes may be occurring. Alternatively, the processes may be abnormal under influence of a failure of the hardware forming the server. Thus, in this case, the monitoring hardware judges whether or not there is an abnormality in the hardware forming the server.

If there is an abnormality in the hardware, the abnormality of the processes in the server is caused by the hardware. Therefore, the hardware with an abnormality is determined as the failure occurrence point. In the case where there is no abnormality in the hardware, on the other hand, the failure is peculiar to each of the processes. Therefore, the processes with an abnormality are determined as the failure occurrence point.

In the case of a process in a relay device or a process related to relaying such as ping in the NIC of a server, the state of the associated process indicates whether or not an error is issued as a result of the associated process operating normally.

In this case, the determination of the failure occurrence point depends on the combination of the issuing process and the associated process. For example, in the case where the issuing process is ColdStart, when an abnormality of ColdStart is sensed, it is found that the relay device has not been restarted. In such a case, ColdStart, of which an abnormality is sensed, is determined as the failure occurrence point without the need to reference the associated process.

In the case where the issuing process is Link, ping in a subordinate device connected to a port which is DOWN is determined as the associated process. Thus, the failure occurrence point is determined on the basis of the state of ping. For example, if ping in the device connected to the port which is DOWN is normal, it is judged that there is a failure (erroneous operation) in Link itself which is the issuing process, and Link which is the issuing process is determined as the failure occurrence point.

In the case where an abnormality of ping in the device connected to the port which is DOWN is sensed, on the other hand, it is indicated that Link which is the issuing process is DOWN. In this case, an abnormality is sensed normally for both Link which is the issuing process and ping in the device connected to the port which is DOWN. Thus, in this case, it is judged that there is a failure in the link between the sender device and the subordinate device, and the link between the sender device and the subordinate device is determined as the failure occurrence point.

In the case where the issuing process is ping, meanwhile, processes (ColdStart, Link, and ping) in a relay device in a level higher than the sender device are specified as the associated process. In this case, if an abnormality of ColdStart, among the associated processes in the relay device in the higher level, is sensed, an abnormality of ping in the sender device has been sensed due to an abnormality of a restarting operation of the relay device in the higher level. Thus, in such a case, ColdStart is determined as the failure occurrence point.

In the case where Link, among the associated processes in the relay device in the higher level, is DOWN for a port for the sender device, an abnormality is sensed normally for both ping which is the issuing process and Link (DOWN) in the relay device in the higher level. Thus, in this case, it is judged that there is a failure in the link between the sender device and the relay device in the higher level, and the link between the sender device and the relay device in the higher level is determined as the failure occurrence point.

In the case where an abnormality of ping, among the associated processes in the relay device in the higher level, is sensed, a relay device in a further higher level is additionally specified to determine the failure occurrence point in substantially the same way. If ping in the relay device in the higher level is normal, there is a failure (erroneous operation) in ping itself in the subordinate device. Therefore, ping in the subordinate device is determined as the failure occurrence point.

In this way, the type and the state of processes are specified while exploring toward higher levels from the issuing process as the starting point to determine the failure occurrence point. This makes it possible to specify the root cause of an abnormality sensed by the issuing process from within the network. The processes performed by the specifying section 1708 and the determination section 1709 will be described in detail later using flowcharts.

The notification section 1710 has a function of making a notification of the failure occurrence point specified by the determination section 1709. Specifically, the notification section 1710 displays the failure occurrence point on a display, outputs a warning sound, sends a print output to a printer, or transmits the failure occurrence point to an external terminal, for example.

(Generation Process for Hierarchical Structure Information)

Figure 18:
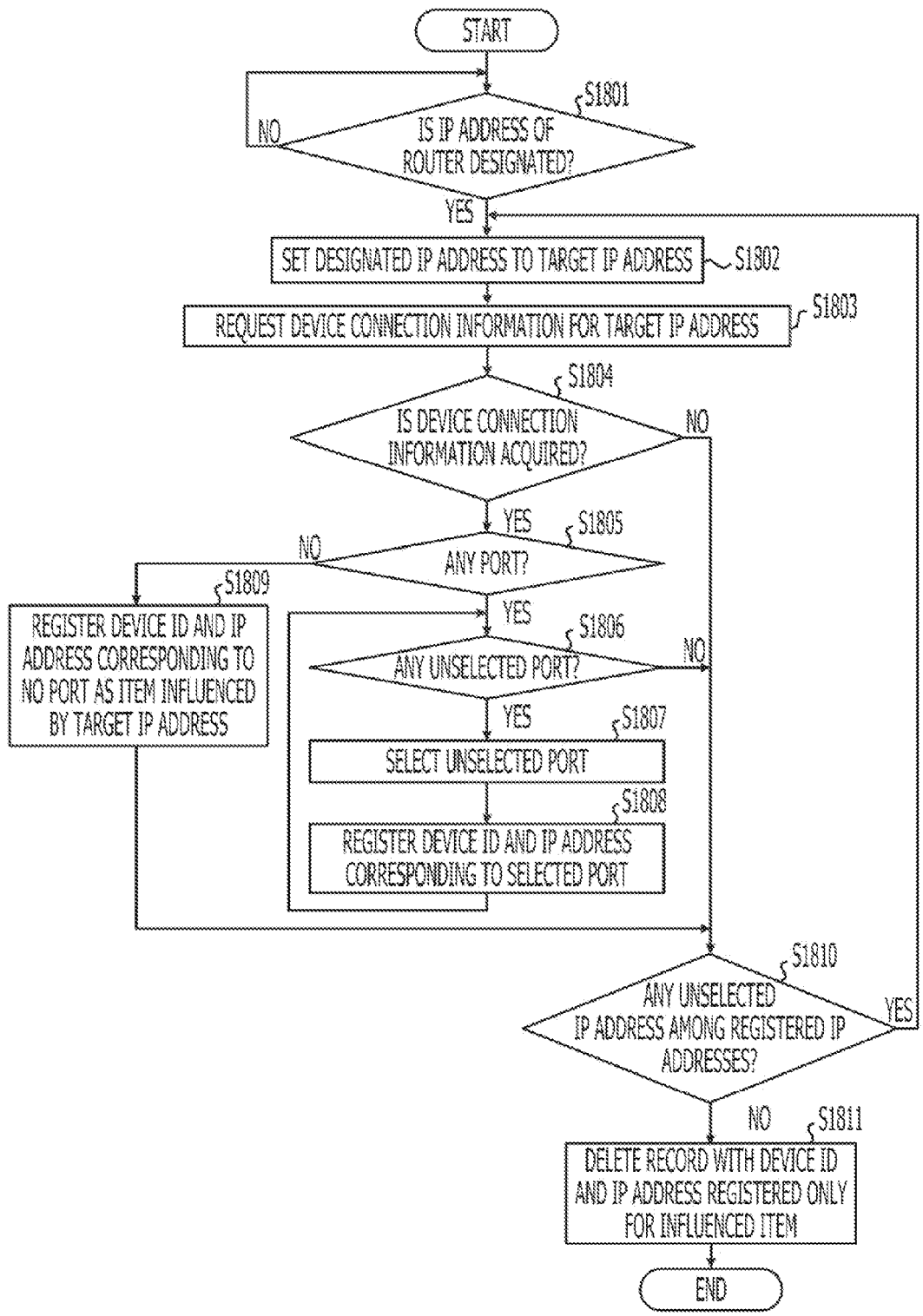
FIG. 18 illustrates a procedure (part 1) of a hierarchical structure information generation process.
Figure 19:
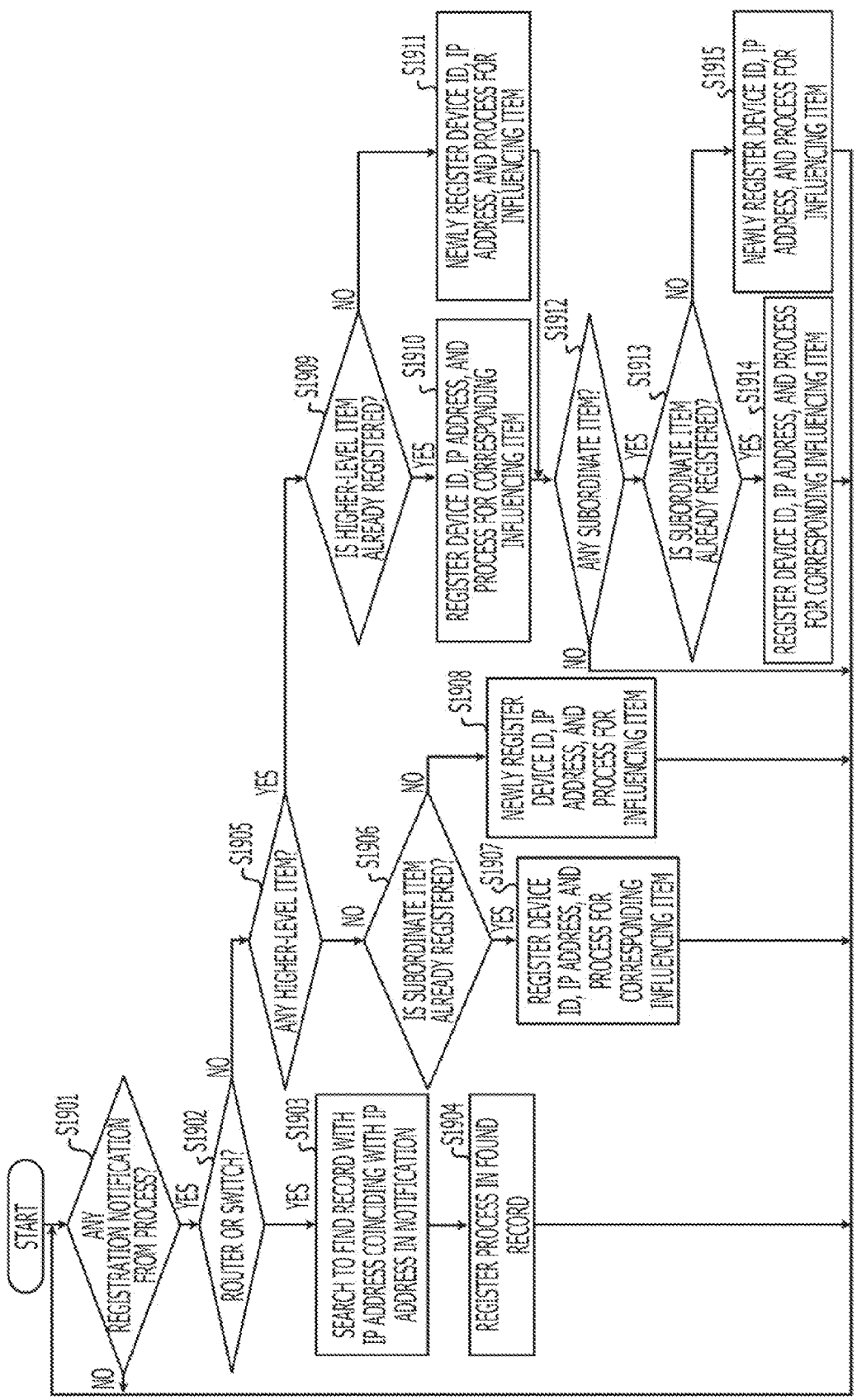
FIG. 19 illustrates a procedure (part 2) of the hierarchical structure information generation process.

FIGS. 18 and 19 are each a flowchart illustrating a procedure of a hierarchical structure information generation process. Specifically, a device ID and an IP address are registered for a higher-level (influencing) item and a lower-level (influenced) item in the association DB 700 in FIG. 18, and a process ID of a process is registered in FIG. 19.

First, as illustrated in FIG. 18, the monitoring apparatus 101 waits for the IP address of the router as a device in the highest level to be designated (step S1801: No). In the case where the IP address of the router is designated (step S1801: Yes), the monitoring apparatus 101 sets the designated IP address to the target IP address to newly register the target IP address together with a device ID corresponding to the target IP address for a higher-level (influencing) item in the association DB 700 (step S1802).

Then, the monitoring apparatus 101 requests device connection information for the target IP address from a device with the target IP address (step S1803). Next, the monitoring apparatus 101 judges whether or not the requested device connection information has been successfully acquired (step S1804). In the case where the requested device connection information has not been successfully acquired (step S1804: No), the monitoring apparatus 101 finds that the device corresponding to the target IP address is one of the servers S1 to S3, because the servers S1 to S3 do not have a device connection information DB. In this case, the process proceeds to step S1810.

In the case where the requested device connection information has been successfully acquired (step S1804: Yes), on the other hand, the monitoring apparatus 101 judges whether or not a port is provided in the device connection information (step S1805). In the case where a port is provided (step S1805: Yes), the monitoring apparatus 101 judges whether or not there is an unselected port (step S1806). In the case where there is an unselected port (step S1806: Yes), the monitoring apparatus 101 selects the unselected port (step S1807), and registers a device ID and an IP address corresponding to the selected port in the association DB 700 (step S1808). Specifically, since the target IP address is registered for a higher-level (influencing) item, the monitoring apparatus 101 registers the device ID and the IP address for a corresponding influencing item. Then, the process returns to step S1806.

In the case where there is no unselected port in step S1806 (step S1806: No), on the other hand, the process proceeds to step S1810.

In the case where no port is provided in step S1805 (step S1805: No), meanwhile, the monitoring apparatus 101 registers a device ID and an IP address corresponding to no port for an item influenced by the target IP address (step S1809). Then, the process proceeds to step S1810. In the case where monitoring hardware is specified by the target IP address, device connection information is successfully acquired in step S1804, because the monitoring hardware has a device connection information DB unlike the servers. However, no port is provided in the acquired device connection information, and therefore "a device ID and an IP address corresponding to no port", that is, the device ID and the IP address of the server, are registered for an influenced item.

In step S1810, the monitoring apparatus 101 judges whether or not there is an unselected IP address among the IP addresses registered for influenced items in the association DB 700 (step S1810). In the case where there is an unselected IP address (step S1810: Yes), the process returns to step S1802, where the monitoring apparatus 101 sets the unselected IP address to the target IP address to newly register the target IP address together with a corresponding device ID for a higher-level (influencing) item (step S1802). In the case where there is no unselected IP address (step S1810: No), on the other hand, the monitoring apparatus 101 deletes a record with a device ID and an IP address registered only for an influenced item (step S1811). The sequence of processes is thus terminated.

Next, the flowchart of FIG. 19 will be described. When the processes of FIG. 18 are terminated, the device IDs and the IP addresses are registered in the association DB 700. In FIG. 19, first, the monitoring apparatus 101 waits for a registration notification for a process to be received from a device including the process (step S1901: No). In the case where a registration notification is received (step S1901: Yes), the monitoring apparatus 101 judges whether or not the device making the notification is a relay device (a router or a switch) on the basis of the device ID in the received registration notification (step S1902).

In the case where the device making the notification is a relay device (step S1902: Yes), the monitoring apparatus 101 searches the association DB 700 to find a record with an IP address coinciding with the IP address in the registration notification (step S1903). Then, the monitoring apparatus 101 registers the process in the registration notification in the found record (step S1904), and returns to step S1901.

In the case where the device making the notification is not the router R or the switches s1 to s3 in step S1902 (step S1902: No), on the other hand, the registration notification is from one of the servers S1 to S3. Therefore, the monitoring apparatus 101 judges whether or not the registration notification from one of the servers S1 to S3 is provided with a higher-level item (step S1905).

In the case where it is judged that there is no higher-level item (step S1905: No), the received registration notification is as illustrated in FIG. 13. In this case, the monitoring apparatus 101 judges whether or not a subordinate item is already registered as a lower-level (influenced) item in the association DB 700 (step S1906). In the case where a subordinate item is already registered (step S1906: Yes), the monitoring apparatus 101 registers the device ID, the IP address, and the process in the registration notification for a corresponding higher-level (influencing) item in the association DB 700 (step S1907), and returns to step S1901. In the case where a subordinate item is not yet registered (step S1906: No), on the other hand, the monitoring apparatus 101 newly registers the device ID, the IP address, and the process in the registration notification for a higher-level (influencing) item in the association DB 700 (step S1908), and returns to step S1901.

In the case where it is judged in step S1905 that there is a higher-level item (step S1905: Yes), the received registration notification is as illustrated in FIG. 14 or 15. In this case, the monitoring apparatus 101 judges whether or not the higher-level item is already registered in the association DB 700 (step S1909).

In the case where the higher-level item is already registered (step S1909: Yes), the monitoring apparatus 101 registers the device ID, the IP address, and the process in the registration notification for a corresponding influencing item in the association DB 700 (step S1910), and proceeds to step S1912. In the case where the higher-level item is not yet registered (step S1909: No), on the other hand, the monitoring apparatus 101 newly registers the device ID, the IP address, and the process in the registration notification for an influenced item in the association DB 700 (step S1911), and proceeds to step S1912.

Then, in step S1912, the monitoring apparatus 101 judges whether or not there is a subordinate item (step S1912). In the case where it is judged that there is no subordinate item (step S1912: No), the received registration notification is as illustrated in FIG. 15. In this case, the process returns to step S1901 because there is no content to be registered.

In the case where it is judged that there is a subordinate item (step S1912: Yes), on the other hand, the received registration notification is as illustrated in FIG. 14. In this case, the monitoring apparatus 101 judges whether or not the subordinate item is already registered as an influenced item in the association DB 700 (step S1913). In the case where the subordinate item is already registered (step S1913: Yes), the monitoring apparatus 101 registers the device ID, the IP address, and the process in the registration notification for a corresponding influencing item in the association DB 700 (step S1914), and returns to step S1901. In the case where the subordinate item is not yet registered (step S1913: No), on the other hand, the monitoring apparatus 101 newly registers the device ID, the IP address, and the process in the registration notification for an influencing item in the association DB 700 (step S1915), and returns to step S1901.

The association DB 700 illustrated in FIG. 7 is completed through such processes to represent the hierarchical structure information illustrated in FIG. 6.

Figure 20:
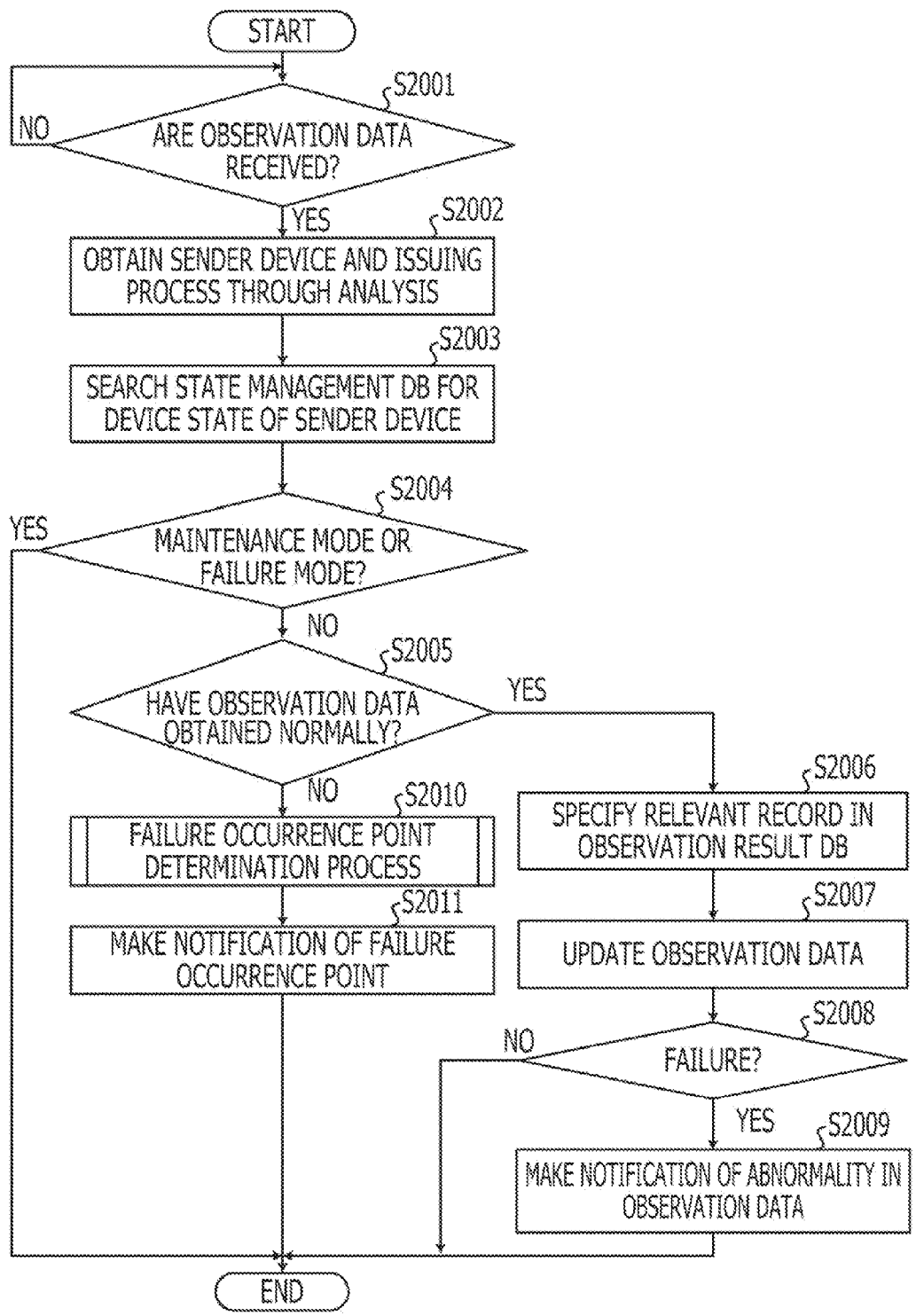
FIG. 20 illustrates a procedure of a monitoring process.

FIG. 20 is a flowchart illustrating a procedure of a monitoring process. First, the monitoring apparatus 101 waits for observation data 1600 to be received (step S2001: No). In the case where observation data 1600 are received (step S2001: Yes), the monitoring apparatus 101 obtain a sender device and an issuing process through analysis of the observation data 1600 (step S2002). After that, the monitoring apparatus 101 searches the state management DB 900 using the device ID of the sender device obtained through the analysis as a key to find the device state of the sender device (step S2003).

Next, the monitoring apparatus 101 judges, through the first judgment section 1703, whether or not the device state of the sender device indicates a maintenance mode or a fault mode (step S2004). In the case where the maintenance mode or the fault mode is indicated (step S2004: Yes), the sequence of processes is terminated.

In the case where the maintenance mode or the fault mode is not indicated (step S2004: No), on the other hand, the monitoring apparatus 101 judges, through the second judgment section 1704, whether or not the observation data 1600 have been obtained normally (step S2005). In the case where the observation data 1600 have been obtained normally (step S2005: Yes), the monitoring apparatus 101 specifies a relevant record in the observation result DB 800 on the basis of the device ID of the sender device and the IP address (step S2006), and updates the observation data 1600 (step S2007).

Then, the monitoring apparatus 101 judges, through the third judgment section 1705, whether or not the observation data 1600 indicate a failure (step S2008). In the case where it is determined that there is no failure (step S2008: No), the sequence of processes is terminated. In the case where it is determined that there is a failure (step S2008: Yes), the monitoring apparatus 101 makes a notification of the abnormality in the observation data 1600 through the notification section 1710 (step S2009), and terminates the sequence of processes.

In the case where it is determined in step S2005 through the second judgment section 1704 that the observation data 1600 have not been obtained normally (step S2005: No), meanwhile, the monitoring apparatus 101 executes a failure occurrence point determination process (step S2010) to determine a failure occurrence point. Then, the monitoring apparatus 101 makes a notification of the determined failure occurrence point (step S2011), and terminates the sequence of processes.

Figure 21:
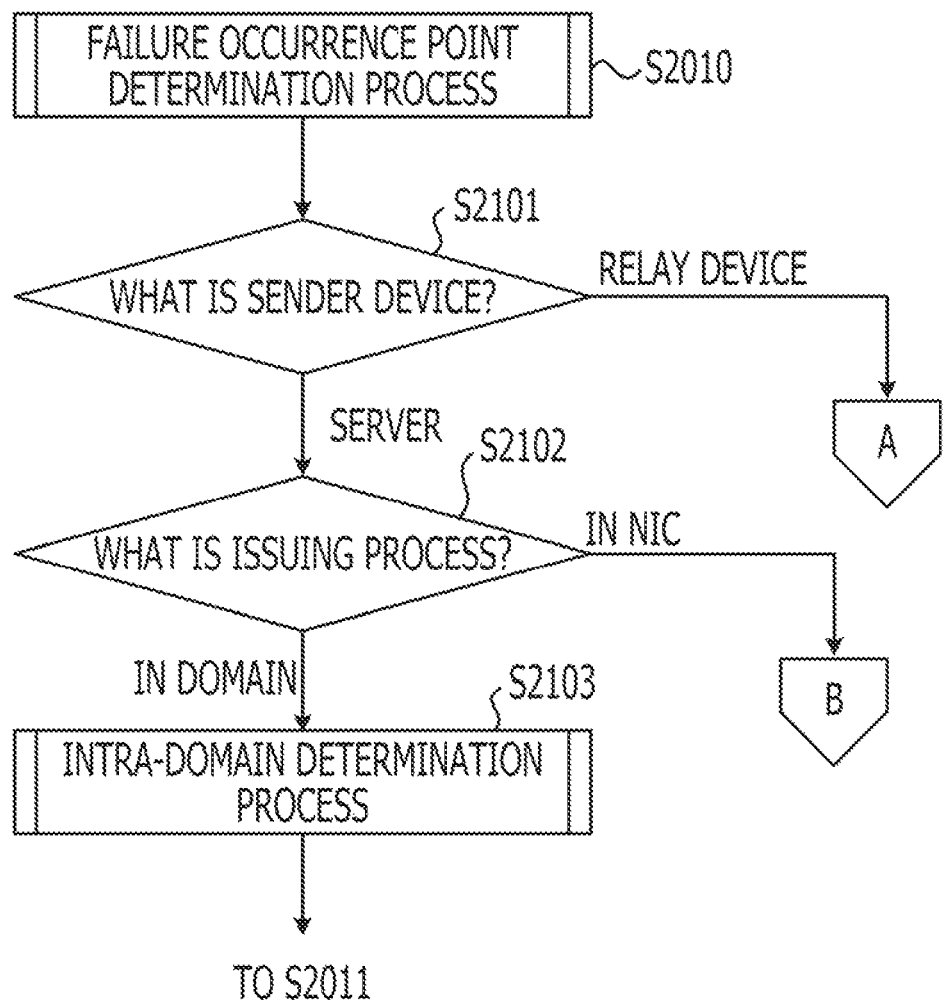
FIG. 21 illustrates a detailed procedure (part 1) of a failure occurrence point determination process (step S2010) illustrated in FIG. 20.
Figure 22:
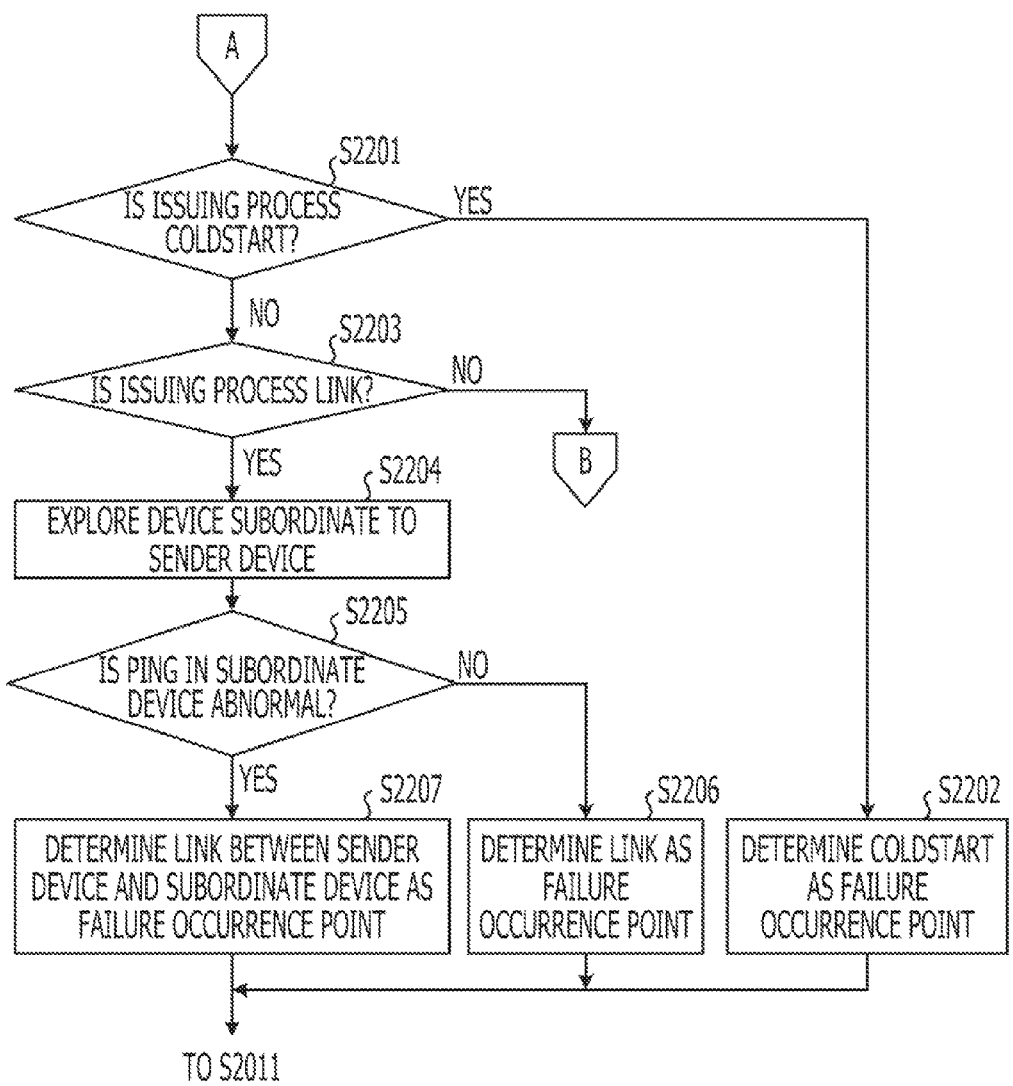
FIG. 22 illustrates a detailed procedure (part 2) of the failure occurrence point determination process (step S2010) illustrated in FIG. 20.
Figure 23:
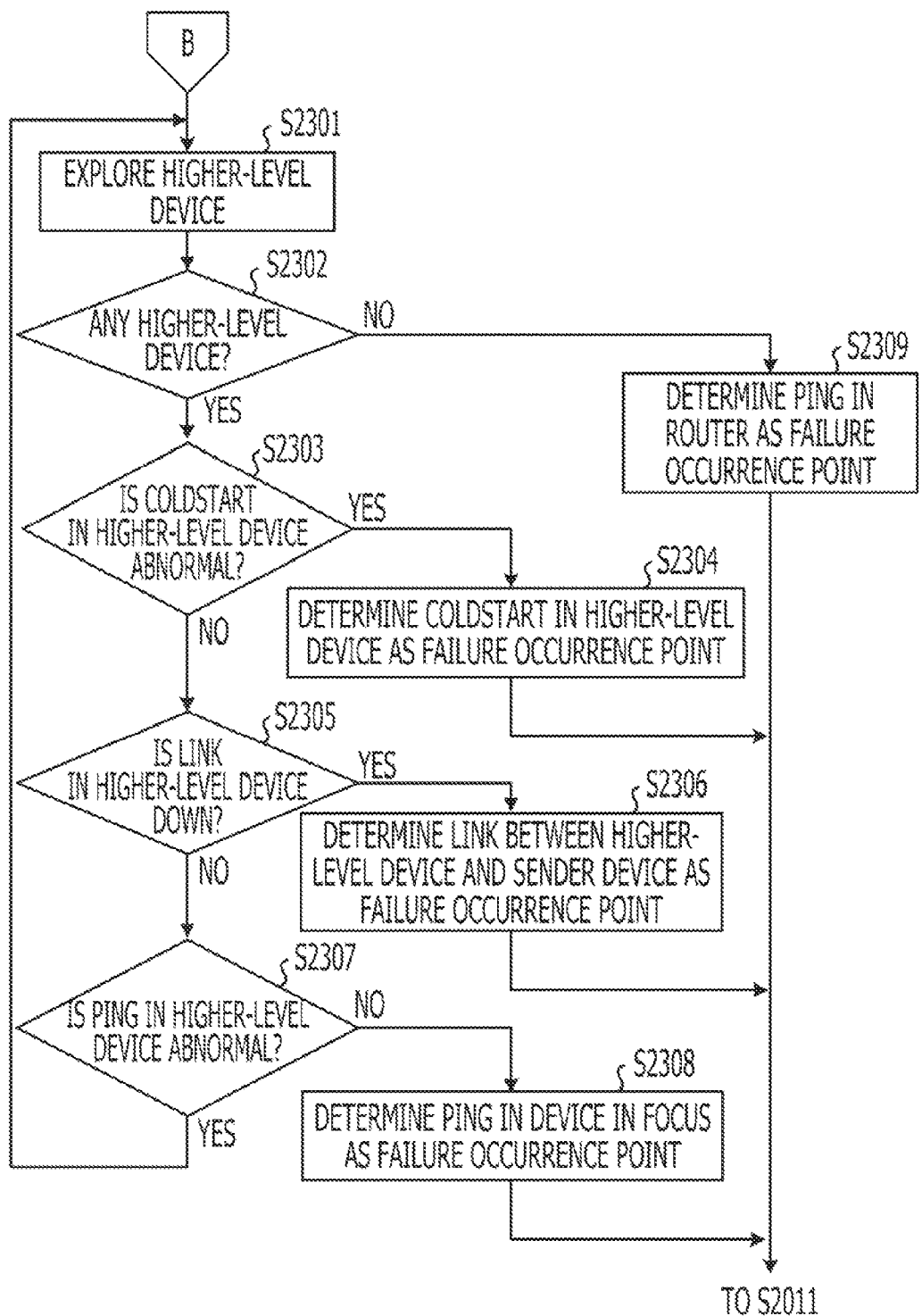
FIG. 23 illustrates a detailed procedure (part 3) of the failure occurrence point determination process (step S2010) illustrated in FIG. 20.

FIGS. 21 to 23 are each a flowchart illustrating a detailed procedure of the failure occurrence point determination process (step S2010) illustrated in FIG. 20. In FIG. 21, first, the monitoring apparatus 101 judges the type of the sender device (step S2101). In the case where the sender device is a relay device (step S2101: Relay Device), the process proceeds to step S2201 of FIG. 22.

In the case where the sender device is a server (step S2101: Server), on the other hand, the monitoring apparatus 101 judges whether the issuing process is a process in the NIC or a process in a domain (step S2102). In the case where the issuing process is a process in the NIC (step S2102: In NIC), the process proceeds to step S2301 of FIG. 23. In the case where the issuing process is a process in a domain (step S2102: In Domain), on the other hand, the monitoring apparatus 101 executes an intra-domain determination process (step S2103). Then, the process proceeds to step S2011. The detailed procedure of the intra-domain determination process (step S2103) will be discussed later in relation to FIG. 24.

In FIG. 22, first, the monitoring apparatus 101 judges whether or the issuing process is ColdStart (step S2201). In the case where the issuing process is ColdStart (step S2201: Yes), the monitoring apparatus 101 determines ColdStart as the failure occurrence point (step S2202). Then, the process proceeds to step S2011.

In the case where the issuing process is not ColdStart (step S2201: No), on the other hand, the monitoring apparatus 101 judges whether or not the issuing process is Link (step S2203). In the case where the issuing process is not Link (step S2203: No), the issuing process is ping, and the process proceeds to step S2301 of FIG. 23.

In the case where the issuing process is Link (step S2203: Yes), on the other hand, the monitoring apparatus 101 references the hierarchical structure information to explore a subordinate device connected to a port which is DOWN, among subordinate devices in a level lower than the sender device (step S2204). For example, if the sender device is the router R and the port 1 is DOWN in the example of FIG. 6, the monitoring apparatus 101 explores the switch s1.

Then, the monitoring apparatus 101 judges from the observation result DB 800 whether or not an abnormality of ping in the subordinate device is sensed (step S2205). In the case where an abnormality of such ping is not sensed (step S2205: No), the monitoring apparatus 101 determines Link which is the issuing process as the failure occurrence point (step S2206). Then, the process proceeds to step S2011.

In the case where an abnormality of ping in the subordinate device is being sensed (step S2205: Yes), meanwhile, Link which is the issuing process and ping in the subordinate device are operating normally (sensing an abnormality). Thus, the monitoring apparatus 101 determines the link between the sender device and the subordinate device as the failure occurrence point (step S2207). Then, the process proceeds to step S2011.

Next, as illustrated in FIG. 23, because an abnormality of ping in the device currently in focus is sensed, the monitoring apparatus 101 references the hierarchical structure information to explore a higher-level device (step S2301), and judges whether or not there is a higher-level device (step S2302). In the case where there is a higher-level device (step S2302: Yes), the monitoring apparatus 101 references the observation result DB 800 to judge whether or not there is an abnormality in ColdStart in the higher-level device (step S2303).

In the case where there is an abnormality (step S2303: Yes), it is found that the sensed abnormality of ping in the device in focus is caused by the abnormality in ColdStart in the higher-level device. Thus, the monitoring apparatus 101 determines ColdStart in the higher-level device as the failure occurrence point (step S2304). Then, the process proceeds to step S2011.

In the case where there is no abnormality in ColdStart in the higher-level device in step S2303 (step S2303: No), meanwhile, the monitoring apparatus 101 references the observation result DB 800 to judge whether or not Link in the higher-level device is DOWN (step S2305). In the case where Link in the higher-level device is DOWN (step S2305: Yes), ping in the device in focus and Link in the higher-level device are operating normally (sensing an abnormality). Thus, the monitoring apparatus 101 determines the link between the higher-level device and the sender device as the failure occurrence point (step S2306). Then, the process proceeds to step S2011.

In the case where Link is UP in step S2305 (step S2305: No), on the other hand, the monitoring apparatus 101 references the observation result DB 800 to judge whether or not an abnormality of ping in the higher-level device is sensing (step S2307). In the case where an abnormality of ping is not sensed (step S2307: No), the monitoring apparatus 101 determines ping in the device in focus as the failure occurrence point (step S2308). Then, the process proceeds to step S2011.

In the case where an abnormality of ping in the higher-level device is sensed (step S2307: Yes), on the other hand, the process returns to step S2301, where the monitoring apparatus 101 explores a device in a further higher level (step S2301). In this case, the device which executed ping, an abnormality of which was sensed in step S2307 (the previous higher-level device), will be the device in focus.

In the case where there is no higher-level device in step S2302 (step S2302: No), meanwhile, the router R is the higher-level device in which an abnormality of ping is sensed. Therefore, the monitoring apparatus 101 determines ping in the router R as the failure occurrence point (step S2309). Then, the process proceeds to step S2011.

Figure 24:
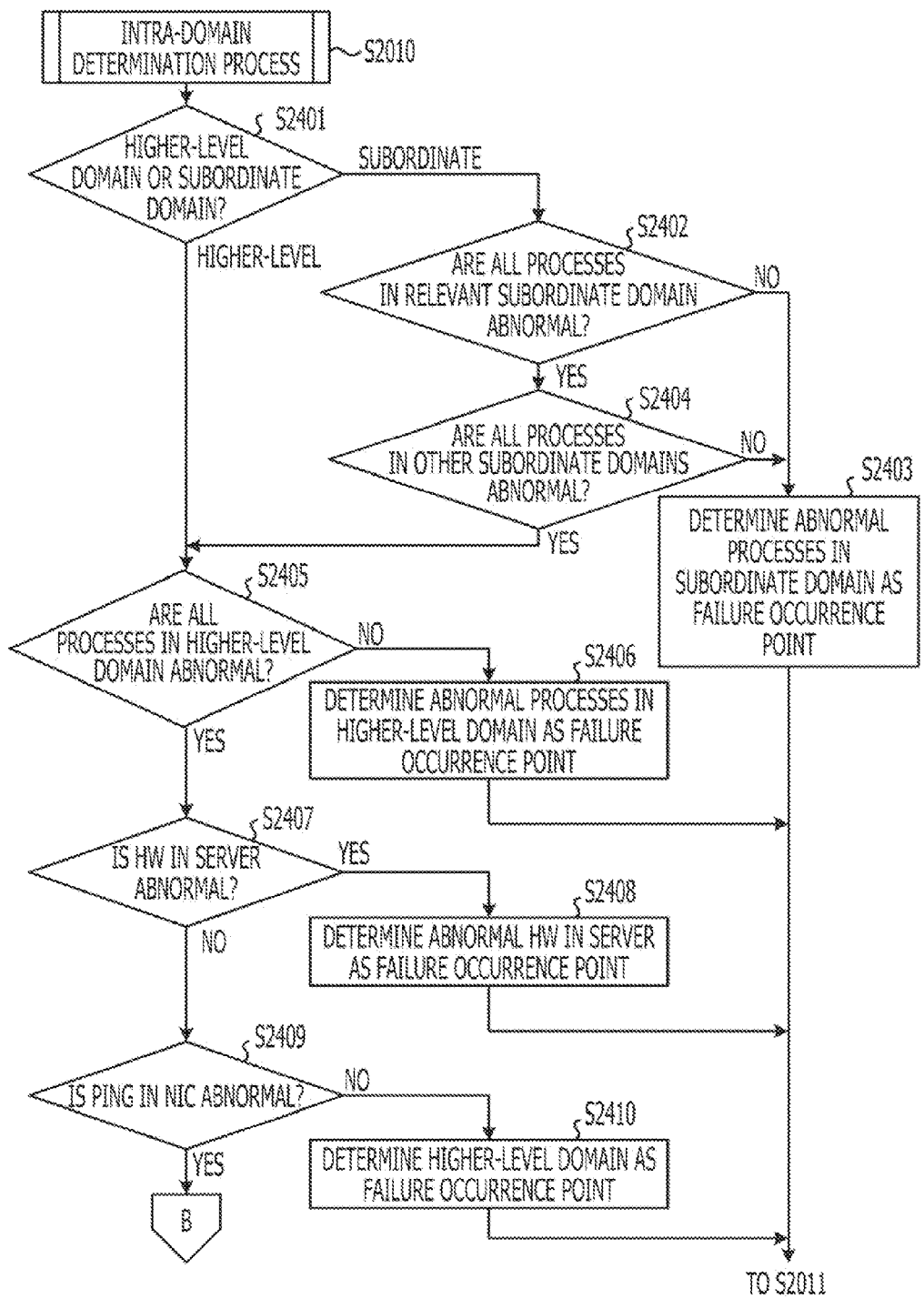
FIG. 24 illustrates a detailed procedure of an intra-domain determination process (step S2010) illustrated in FIG. 20.

FIG. 24 is a flowchart illustrating a detailed procedure of the intra-domain determination process (step S2010) illustrated in FIG. 20. First, the monitoring apparatus 101 judges whether the issuing process is in a higher-level domain (Domain-0) or a subordinate domain (Domain-U) (step S2401). In the case where the issuing process is in a subordinate domain (step S2401: Subordinate), the monitoring apparatus 101 judges whether or not all the processes in the relevant subordinate domain are abnormal (step S2402). In the case where all the processes in the subordinate domain are not abnormal (step S2402: No), the monitoring apparatus 101 determines abnormal one of the processes in the subordinate domain as the failure occurrence point (step S2403), and proceeds to step S2011.

In the case where all the processes in the relevant subordinate domain are abnormal in step S2402 (step S2402: Yes), on the other hand, the monitoring apparatus 101 judges whether or not all the processes in other subordinate domains are abnormal (step S2404). This is, for example, a case where a plurality of virtual machine functions are run. In the case where there are normal processes in the other subordinate domains (step S2404: No), the process proceeds to step S2403.

In the case where all the processes in the other subordinate domains are abnormal (step S2404: Yes), on the other hand, the process proceeds to step S2405. In the case where the issuing process is in a higher-level domain (Domain-0) in step S2401 (step S2401: Higher-Level), meanwhile, the process proceeds to step S2405.

In step S2405, the monitoring apparatus 101 judges whether or not all the processes in the higher-level domain are abnormal (step S2405). In the case where there are normal processes (step S2405: No), the monitoring apparatus 101 determines abnormal ones of the processes in the higher-level domain as the failure occurrence point (step S2406), and proceeds to step S2011.

In the case where all the processes in the higher-level domain are abnormal (step S2405: Yes), on the other hand, the monitoring apparatus 101 judges, on the basis of the result of monitoring performed by the monitoring hardware stored in the observation result DB 800, whether or not there is an abnormality in the hardware forming the server (step S2407). In the case where there is an abnormality in the hardware (step S2407: Yes), the abnormal hardware in the server is determined as the failure occurrence point (step S2408), and the process proceeds to step S2011.

In the case where there is no abnormality in the hardware (step S2407: No), on the other hand, the monitoring apparatus 101 judges whether or not an abnormality of ping in the NIC of the server is sensed (step S2409). In the case where no abnormality is sensed (step S2409: No), the monitoring apparatus 101 determines the individual processes in the higher-level domain as the failure occurrence point (step S2410), and proceeds to step S2011. In the case where an abnormality of ping in the NIC is sensed (step S2409: Yes), on the other hand, the process proceeds to step S2301, where the monitoring apparatus 101 explores a higher-level device.

According to the monitoring apparatus 101, as has been described above, the hierarchical structure information on the processes in the network 100 is referenced to specify an associated process in accordance with the type of the device executing the issuing process as the starting point. Then, a failure occurrence point is determined on the basis of the state of the associated process. By comprehensively judging the hierarchical relationship of the processes in the network 100 as described above, the accuracy in specifying the failure occurrence point in the network 100 can be improved.

In the case where the sender device is a server, the failure occurrence point can be found out on the basis of the state of the issuing process and the remaining processes in the same level. Specifically, in the case where some of the remaining processes in the same level are abnormal, the issuing process and such abnormal processes are determined as the failure occurrence point. That is, it is found that the abnormal processes individually have a failure because there are also processes that are executed normally.

In the case where all the remaining processes in the same level are abnormal, on the other hand, the failure occurrence point is determined on the basis of the type and the state of a process in a higher level. For example, in the case where the process in the higher level is ping, if an abnormality of ping is not sensed, all the processes subordinate to ping in the server are each determined as the failure occurrence point.

In this case, however, there remains a possibility that the hardware forming the server is at fault. Therefore, the monitoring hardware senses an abnormality of the hardware forming the server by referencing the observation result DB 800. Then, if there is an abnormality in the hardware, it is found that the abnormalities of all the processes subordinate to ping in the server are caused by the behavior of the abnormal hardware. Thus, in this case, the abnormal hardware is determined as the failure occurrence point. In this way, the specific failure occurrence point can be found out.

If an abnormality of ping is sensed, it may also be necessary to check processes in a relay device in a level higher than the server. In this case, if an abnormality of ping in the relay device in the higher level is also sensed, it may be necessary to explore and check a relay device in a further higher level. In this way, the root cause of a failure can be found out by referencing the hierarchical structure information.

In the case where all the processes in the relay device in the higher level are normal, it is found that the failure is caused by an erroneous operation of ping in the NIC of the server.

In the case where there is an abnormality in ColdStart in the relay device in the higher level, the relay device has not been successfully restarted. In such a case, it is found that the erroneous operation of ping in the NIC of the server is caused by the abnormality of ColdStart. Thus, it can be found out that ColdStart is the failure occurrence point.

In the case where, in Link in the relay device in the higher level, the link to the server in which an abnormality of ping is sensed, among the servers connected to the ports, is DOWN, it is found that the sensed abnormality of ping is caused by the link to the server being DOWN. Thus, in such a case, it can be found out that there is a failure in the link between the server and the relay device.

The failure occurrence point can also be found out when the sender device is a relay device. Specifically, in the case where the sender device is a relay device and the issuing process is ColdStart, ColdStart is determined as the failure occurrence point.

In the case where the issuing process is Link, the failure occurrence point is determined on the basis of the state of ping in a device connected to a port which is DOWN. Specifically, it is found that the sensed abnormality of ping in the device connected to the port is caused by the link to the server being DOWN. Thus, in such a case, it can be found out that there is a failure in the link between the server and the relay device.

In the case where an abnormality of ping in a device connected to a port is not sensed, there is an abnormality in Link itself which is the issuing process. Thus, in such a case, it can be found out that Link which is the issuing process is the failure occurrence point.

In the case where the issuing process is ping, the failure occurrence point is determined on the basis of the state of processes in a relay device in a higher level. For example, in the case where an abnormality of ping in the relay device in the higher level is also sensed, it may be necessary to explore and check a relay device in a further higher level. In this way, the root cause of a failure can be found out by referencing the hierarchical structure information.

In the case where the processes in the relay device in the higher level are normal, there is an abnormality in ping itself which is the issuing process. Thus, in such a case, it can be found out that ping which is the issuing process is the failure occurrence point.

In the case where there is an abnormality in ColdStart in the relay device in the higher level, the relay device has not been successfully restarted. In such a case, it is found that the erroneous operation of ping, which is the issuing process, in the sender device is caused by the abnormality of ColdStart. Thus, it can be found out that ColdStart is the failure occurrence point.

In the case where, in Link in the relay device in the higher level, the link to the server in which an abnormality of ping is sensed, among the servers connected to the ports, is DOWN, it is found that the sensed abnormality of ping is caused by the link to the sender device being DOWN. Thus, in such a case, it can be found out that there is a failure in the link between the relay device in the higher level and the sender device.

According to the embodiment, as has been described above, when there is an abnormality in a process executed in a network, it can be found out what caused the abnormality and what sensed the abnormality. Therefore, the failure occurrence point can be specified efficiently. In addition, the specifying accuracy can be improved. By preparing hierarchical structure information on processes in advance, the failure occurrence point can be specified immediately even in the case where there is an abnormality in observation data. Thus, immediate measures can be taken after occurrence of a failure. By causing the monitoring apparatus 101 to observe the process determined as the failure occurrence point again, inconsistency with the second observation results caused by a time lag in sensing schedule can be resolved. Thus, the accuracy in specifying the failure occurrence point can be improved to take more immediate measures.

The monitoring method described in the embodiment can be implemented by executing a program prepared in advance on a computer such as a personal computer or a work station. The monitoring program may be stored in a computer-readable storage medium such as a hard disk, a flexible disk, a CD-ROM, an MO, and a DVD, and executed when read from the storage medium by the computer. The monitoring program may also be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A computer-readable, non-transitory medium storing a monitoring program for causing a computer to execute predetermined processes, the computer configured to access a storage device storing hierarchical structure information in which a hierarchical structure from processes in a device in a highest level to processes in terminal devices is represented by a connection relationship between devices forming a network and processes executed in the devices, the predetermined processes comprising:

receiving, by a reception process, abnormal observation data from within the network;

detecting, by a detection process, a sender device that transmitted the abnormal observation data received in the reception process and an issuing process that issued the abnormal observation data;

referencing, by a specifying process, the hierarchical structure information to specify an associated process associated with the issuing process in accordance with a type of the sender device detected in the detection process;

determining, by a determination process, a failure occurrence point based on a state of the associated process specified in the specifying process; and notifying, by a notification process, the failure occurrence point determined in the determination process.

2. The computer-readable, non-transitory medium according to claim 1, wherein when the sender device is a server, the specifying process specifies remaining processes in a same level as the issuing process as the associated process.

3. The computer-readable, non-transitory medium according to claim 2, wherein when some of the remaining processes in the same level as the issuing process are abnormal, the determination process determines the issuing process and the some of the remaining processes as the failure occurrence point.

4. The computer-readable, non-transitory medium according to claim 2, wherein when all of the remaining processes in the same level as the issuing process are abnormal, the specifying process additionally specifies processes in a level higher than the issuing process in the sender device as the associated process, and the determination process determines the failure occurrence point based on the type and the state of the processes in the higher level additionally specified as the associated process in the specifying process.

5. The computer-readable, non-transitory medium according to claim 4, wherein when the associated process is a process related to confirming communication with a device in a higher level, the determination process determines the failure occurrence point based on the state of the process related to confirming such communication.

6. The computer-readable, non-transitory medium according to claim 5,
wherein when the process related to confirming communication with a device in a higher level is normal, the determination process determines abnormal ones of processes in levels lower than the process related to confirming communication with a device in a higher level as the failure occurrence point.

7. The computer-readable, non-transitory medium according to claim 5,
wherein when the process related to confirming communication with a device in a higher level is normal, the specifying process additionally specifies a monitoring process of monitoring hardware forming the server as the associated process, and
the determination process determines hardware, an abnormality of which is sensed in the monitoring process, as the failure occurrence point.

8. The computer-readable, non-transitory medium according to claim 5,
wherein when the process related to confirming communication with a device in a higher level is abnormal, the specifying process additionally specifies processes in a relay device in a level higher than the sender device as the associated process.

9. The computer-readable, non-transitory medium according to claim 8,
wherein when the processes in the relay device in the higher level are normal, the determination process determines the process related to confirming communication with a device in a higher level as the failure occurrence point.

10. The computer-readable, non-transitory medium according to claim 8,
wherein when a process related to restarting the relay device in the higher level, among the processes in the relay device in the higher level, is abnormal, the determination process determines the process related to restarting the relay device in the higher level as the failure occurrence point.

11. The computer-readable, non-transitory medium according to claim 8,
wherein when a process related to a link between the relay device in the higher level and the sender device, among the processes in the relay device in the higher level, is abnormal, the determination process determines the link between the relay device in the higher level and the sender device as the failure occurrence point.

12. The computer-readable, non-transitory medium according to claim 8,
wherein when a process related to confirming communication with a device in a higher level, among the processes in the relay device in the higher level, is abnormal, the specifying process additionally specifies processes in a relay device in a level further higher than the relay device in the higher level as the associated process.

13. The computer-readable, non-transitory medium according to claim 1,
wherein when the sender device is a relay device and the issuing process is a process related to restarting the sender device, the determination process determines such a process as the failure occurrence point.

14. The computer-readable, non-transitory medium according to claim 1,
wherein when the sender device is a relay device and the issuing process is a process related to a link between the sender device and a device in a level lower than the sender device, the specifying process specifies a process related to confirming communication with the sender device in the device in the lower level as the associated process.

15. The computer-readable, non-transitory medium according to claim 14,
wherein when the process related to confirming communication with the sender device is abnormal, the determination process determines the link between the sender device and the device in the lower level as the failure occurrence point.

16. The computer-readable, non-transitory medium according to claim 14,
wherein when the process related to confirming communication with the sender device is normal, the determination process determines the issuing process as the failure occurrence point.

17. The computer-readable, non-transitory medium according to claim 1,
wherein when the sender device is a relay device and the issuing process is a process related to confirming communication with a device in a higher level, the specifying process specifies processes in the device in the level higher than the sender device as the associated process.

18. The computer-readable, non-transitory medium according to claim 17,
wherein when the process related to confirming communication with a device in a higher level is abnormal, the specifying process additionally specifies processes in a relay device in a level higher than the sender device as the associated process.

19. A computer, which is configured to access to hierarchical information indicating a hierarchical structure relating to processes executed by devices included in a network, the computer comprising:
an interface configured to receive abnormal observation data from the network; and
a processor configured to detect a transmission source device of the abnormal observation data and a process by which the abnormal observation data is issued and to specify a process relating, to the detected process in accordance with a kind of the detected transmission source device by referring to the hierarchical information, and to determine, a failure occurrence point based on a status of the specified process.

20. A method for a computer, which is configured to access hierarchical information indicating a hierarchical structure relating to processes executed by devices included in a network, the method comprising:
receiving abnormal observation data from the network;
detecting a transmission source device of the abnormal observation data and a process by which the abnormal observation data is issued;
specifying a process relating, to the detected process in accordance with a kind of the detected transmission source device by referring to the hierarchical information; and
determining, by the computer, a failure occurrence point based on a status of the specified process.

* * * * *